United States Patent
Mikami et al.

(10) Patent No.: US 7,645,502 B2
(45) Date of Patent: Jan. 12, 2010

(54) ANTI-DAZZLING FILM

(75) Inventors: Koichi Mikami, Shinjuku-Ku (JP);
Yukimitsu Iwata, Shinjuku-Ku (JP);
Norinaga Nakamura, Shinjuku-Ku (JP);
Naohiro Matsunaga, Minami-Ashigara (JP)

(73) Assignees: Dai Nippon Printing Co., Ltd., Shinjuku-Ku (JP); Fuji Photo Film Co., Ltd., Minami-Ashigara-Shi (JP)

( * ) Notice: Subject to any disclaimer, the term of this patent is extended or adjusted under 35 U.S.C. 154(b) by 489 days.

(21) Appl. No.: 10/575,043

(22) PCT Filed: Oct. 6, 2004

(86) PCT No.: PCT/JP2004/015107
§ 371 (c)(1),
(2), (4) Date: Apr. 5, 2006

(87) PCT Pub. No.: WO2005/033752
PCT Pub. Date: Apr. 14, 2005

(65) Prior Publication Data
US 2007/0053055 A1    Mar. 8, 2007

(30) Foreign Application Priority Data
Oct. 6, 2003 (JP) .............................. 2003-347218
Dec. 5, 2003 (JP) .............................. 2003-408023

(51) Int. Cl.
*G02B 1/11* (2006.01)
*F21V 9/04* (2006.01)
*G02F 1/1335* (2006.01)
*G02B 27/00* (2006.01)

(52) U.S. Cl. .................. 428/143; 428/212; 428/421; 428/327; 428/221; 359/359; 359/601; 349/137

(58) Field of Classification Search .................. None
See application file for complete search history.

(56) References Cited

U.S. PATENT DOCUMENTS

| | | | |
|---|---|---|---|
| 6,383,620 B1 * | 5/2002 | Aoyama et al. | 428/212 |
| 6,593,058 B1 * | 7/2003 | Feiring et al. | 430/270.1 |
| 2001/0035929 A1 * | 11/2001 | Nakamura et al. | 349/137 |
| 2003/0076596 A1 * | 4/2003 | Miyatake et al. | 359/601 |

FOREIGN PATENT DOCUMENTS

| | | |
|---|---|---|
| JP | 02-041378 | 2/1990 |
| JP | 04-222805 | 8/1992 |
| JP | 08-211234 | 8/1996 |
| JP | 09-043848 A1 | 2/1997 |

(Continued)

*Primary Examiner*—David R Sample
*Assistant Examiner*—April C Inyard
(74) *Attorney, Agent, or Firm*—Burr & Brown

(57) ABSTRACT

An anti-dazzling film is provided, which includes a triacetylcellulose film and an anti-dazzling layer provided on the triacetylcellulose film. The anti-dazzling layer includes a coating composition including an acrylic light transparent resin, plastic light transparent fine particles, and a leveling agent including a copolymer including (meth)acrylic acid repeating units containing at least one perfluoroalkyl group having 8 or more carbon atoms and (meth)acrylic acid repeating units having at least one bornane ring. A low-refractive index layer is provided on the anti-dazzling film to constitute an antireflection film.

36 Claims, 1 Drawing Sheet

FOREIGN PATENT DOCUMENTS

| | | | |
|---|---|---|---|
| JP | 09043848 A * | 2/1997 | |
| JP | 10-309455 | 11/1998 | |
| JP | 2002-243907 | 8/2002 | |
| JP | 2002-277602 | 9/2002 | |
| JP | 2003-026734 | 1/2003 | |
| JP | 2003-270409 A1 | 9/2003 | |

* cited by examiner

ANTI-DAZZLING FILM

TECHNICAL FIELD

The present invention relates to an anti-dazzling (anti-glare) film, an antireflection film, and a polarizing plate and an image display device using the antireflection film.

BACKGROUND ART

An antireflection film is generally disposed on the outermost surface of a display so as to reduce reflectance using the principle of optical interference from the viewpoint of preventing a lowering in contrast and a lowering in visibility caused by external light reflection and reflected image catching in display devices such as cathode-ray tube displays (CRTs), plasma display panels (PDPs), electroluminescent displays (ELDs), and liquid crystal display devices (LCDs).

The antireflection film can be generally prepared by forming a low-refractive index layer having a proper thickness and having a lower refractive index than the support on a support.

In recent years, regarding antireflection films, a trend toward expansion of display markets and an increase in size of displays has particularly led to a demand for a) increased area and homogeneous properties, b) lowered price, and c) improved scratch resistance. The homogeneous properties referred to in the above demand a) means that the planar appearance within the whole display part in the display is homogeneous and there is no variation in properties of the antireflection film typified by reflectance.

Regarding the lowered price in the above demand b), not only a reduction in cost of materials for constituting the antireflection film but also an improvement in productivity of the antireflection film is very important. In order to improve the productivity, the development of a technique which can realize high-speed coating production without sacrificing the homogeneity of planar appearance and other various properties (without sacrificing product yield) has been indispensable. In the production of the antireflection film, as compared with films formed by a dry process typified by vapor deposition and sputtering, basically, the formation of a film by a wet coating process is disadvantageous in that, although there is a potential that low-cost production could be realized, high-speed coating is likely to cause uneven flow, uneven drying, or coating streaks by entrained air and drying air, and, consequently, is likely to cause uneven layer thickness. Thus, maintaining and improving the required homogeneity of the antireflection film is very difficult, leading to a serious problem.

Regarding the scratch resistance in the above demand c), due to the expansion of display markets, the opportunity for rough handling, which has not hitherto been found frequently, is expected to be increased. Accordingly, improving the scratch resistance of the antireflection film used in the outermost surface of the display is becoming a very important task to be attained.

It is known that improving the leveling properties of the coating film is effective in improving uneven layer thickness involved in the above higher-speed coating. The addition of a surfactant (a leveling agent) to a coating liquid has been proposed as one means for improving the leveling properties. This proposal is based on such a mechanism that the addition of a surfactant to a coating liquid causes lowered surface tension to realize improved wettability of an object to be coated with the coating liquid, which then reduces or lowers a surface tension change in the course of coating film formation and consequently prevents flow and convection of the liquid to improve the homogeneity of the film (Kotinguyo Tenkazai No Saishin Gijutsu (Advanced technology for additives for coating), edited by Haruo Kiryu, CMC, 2001).

Japanese Patent Laid-Open No. 249706/2002 discloses a case where excellent leveling properties are realized using a fluoropolymer-type leveling agent containing a perfluoroalkyl group having 6 or less carbon atoms. When coating is carried out using the above fluoro leveling agent, the leveling effect is likely to provide homogeneous planar appearance. Since, however, the surface free energy of a coating film after drying is reduced, stacking of a low-refractive index layer indispensable to the antireflection film onto the coating face weakens the adhesion at the interface. As a result, breaking is likely to occur by external force, disadvantageously leading to a problem that only antireflection films having poor scratch resistance can be produced.

Japanese Patent Laid-Open No. 53878/2003 discloses a method which comprises adding a silicone leveling agent to a coating liquid for high-refractive index layer formation, forming a high-refractive index layer using the coating liquid, and further forming a low-refractive index layer, whereby a leveling agent layer is formed between the high-refractive index layer and the low-refractive index layer. In Japanese Patent Laid-Open No. 53878/2003, however, there is no description on an improvement in scratch resistance. Japanese Patent Laid-Open No. 53878/2003 aims to reduce a difference in refractive index from the high refractive index layer by using a silicone leveling agent having a high refractive index and thus to attain the effect of reducing an increase in reflectance found in the conventional silicone leveling agent. This technique is different from the present invention in purpose. Further, the addition of a silicone leveling agent to an anti-dazzling layer followed by stacking of a low-refractive index layer indispensable to the antireflection film, as with the above case, is disadvantageous in that, although the leveling effect is likely to provide homogeneous planar appearance, the adhesion at the interface of the anti-dazzling layer and the low-refractive index layer is so low that the scratch resistance is significantly lowered, or the low-refractive index layer cannot be coated well on the concave-convex parts in the anti-dazzling layer,-leading to problems such as cissing.

An antireflection film is generally disposed on the outermost surface of a display so as to reduce reflectance using the principle of optical interference from the viewpoint of preventing a lowering in contrast and a lowering in visibility caused by external light reflection and reflected image catching in display devices such as cathode-ray tube displays (CRTs), plasma display panels (PDPs), electroluminescent displays (ELDs), and liquid crystal display devices (LCDs).

The antireflection film can be generally prepared by forming a low-refractive index layer having a proper thickness and having a lower refractive index than the support on a support.

In recent years, regarding antireflection films, a trend toward expansion of display markets and an increase in size of displays has particularly led to a demand for a) increased area and homogeneous properties, b) improved surface hardness and scratch resistance, c) a cost reduction such as high-speed coating and the like. The homogeneous properties referred to in the above demand a) means that there is no variation in properties of the antireflection film typified by reflectance and, in addition, the antireflection film has a homogeneous, abnormality-free planar appearance within the whole display part in the display.

Regarding the surface hardness and scratch resistance in the above demand b) as well, due to the expansion of display markets, the opportunity for rough handling, which has not hitherto been found frequently, is expected to be increased.

Accordingly, improving the surface hardness and scratch resistance of the antireflection film used in the outermost surface of the display is becoming a very important task to be attained.

Regarding the high-speed coating in the above demand c), it is known that improving the leveling properties of the coating film is effective in suppressing uneven layer thickness involved in the above higher-speed coating. The addition of a surfactant (a leveling agent) to a coating liquid has been proposed as one means for improving the leveling properties.

Japanese Patent Laid-Open No. 249706/2002 discloses a case where excellent leveling properties are realized using a fluoropolymer-type leveling agent containing a perfoluoroalkyl group having 6 or less carbon atoms. When coating is carried out using the above fluoro leveling agent, the leveling effect is likely to provide homogeneous planar appearance. Since, however, the surface free energy of a coating film after drying is reduced, stacking of a low-refractive index layer indispensable to the antireflection film onto the coating face weakens the adhesion at the interface. As a result, breaking is likely to occur by external force, disadvantageously leading to a problem that only antireflection films having poor scratch resistance can be produced.

Japanese Patent Laid-Open No. 53878/2003 discloses a method which comprises adding a silicone leveling agent to a coating liquid for high-refractive index layer formation, forming a high-refractive index layer using the coating liquid, and further forming a low-refractive index layer, whereby a leveling agent layer is formed between the high-refractive index layer and the low-refractive index layer. In Japanese Patent Laid-Open No. 53878/2003, however, there is no description on an improvement in scratch resistance. Japanese Patent Laid-Open No. 53878/2003 aims to reduce a difference in refractive index from the high refractive index layer by using a silicone leveling agent having a high refractive index and thus to attain the effect of reducing an increase in reflectance found in the conventional silicone leveling agent. This technique is different from the present invention in purpose. Further, the addition of a silicone leveling agent to an anti-dazzling layer followed by stacking of a low-refractive index layer indispensable to the antireflection film, as with the above case, is disadvantageous in that, although the leveling effect is likely to provide homogeneous planar appearance, the adhesion at the interface of the anti-dazzling layer and the low-refractive index layer is so low that the scratch resistance is significantly lowered, or the low-refractive index layer cannot be coated well on the concave-convex parts in the anti-dazzling layer, leading to problems such as cissing.

In order to provide a surface hardness to be satisfied by an antireflection film, an effective method is to provide a hardcoat layer using, as a binder, a light transparent ionizing radiation curing-type polyfunctional resin of an acrylic resin (for example, an anti-dazzling hardcoat layer to which surface light scattering properties have been imparted by surface concaves and convexes) to a given or larger thickness.

The present inventors, however, have confirmed that this technique involves a latent problem that leads to a lowering in a commercial value, that is, that the application of, for example, ultraviolet light (UV) at an intensity necessary for ensuring the adhesion between the triacetylcellulose film as a support and the layer in direct contact with the triacetylcellulose film causes acrylic resin-derived uneven curing shrinkage, and, in particular, in the hardcoat layer and the anti-dazzling hardcoat layer of which the thickness has been increased for ensuring the surface hardness, the surface of the antireflection film becomes a folded and cockled state, that is, an abnormal appearance occurs.

SUMMARY OF THE INVENTION

First Aspect of the Present Invention

The present inventors have found at the time of the present invention that the formation of an anti-dazzling layer comprising a specific composition can provide an anti-dazzling film, which can be provided by high-speed coating and can meet market demands for an increased area and homogeneous properties and lowered cost while enjoying satisfactory scratch resistance, and an antireflection film using this anti-dazzling film. The present invention has been made based on such finding.

In an embodiment of the present invention, there is provided an anti-dazzling film for constituting an antireflection film comprising a low-refractive index layer, the anti-dazzling film comprising a triacetylcellulose film and an anti-dazzling layer provided on the triacetylcellulose film, the anti-dazzling layer comprising: a light transparent resin comprising an acrylic resin; plastic light transparent fine particles; and a leveling agent comprising a copolymer comprising (meth)acrylic acid repeating units containing at least one perfluoroalkyl group having 8 or more carbon atoms and (meth)acrylic acid repeating units having at least one bornane ring, the low-refractive index layer having a lower refractive index than the refractive index of the anti-dazzling layer being provided on the anti-dazzling layer.

In another embodiment of the present invention, there is provided an antireflection film comprising: a triacetylcellulose film; an anti-dazzling layer; and a low-refractive index layer having a lower refractive index than the refractive index of the anti-dazzling layer provided in that order on the triacetylcellulose film, the anti-dazzling layer comprising: a light transparent resin comprising an acrylic resin; plastic light transparent fine particles; and a leveling agent comprising a copolymer comprising (meth)acrylic acid repeating units containing at least one perfluoroalkyl group having 8 or more carbon atoms and (meth)acrylic acid repeating units having at least one bornane ring.

The present invention can provide an anti-dazzling film, which can be provided by high-speed coating and can meet market demands for an increased area and homogeneous properties and lowered cost while enjoying satisfactory scratch resistance, and an antireflection film using this anti-dazzling film. In particular, when the anti-dazzling film or antireflection film according to the present invention comprises an anti-dazzling layer comprising a specific composition, at the time of high-speed coating of the anti-dazzling layer, good planar appearance or evenness of coated face can be maintained. Therefore, the scratch resistance of the anti-dazzling film or antireflection film can be significantly improved.

Second Aspect of the Present Invention

The present inventors have found at the time of the present invention that the formation of an anti-dazzling layer comprising a specific composition can provide an anti-dazzling film, which, while maintaining satisfactory adhesion between a triacetylcellulose film as a support and a layer in direct contact with the triacetylcellulose film, can ensure satisfactory surface hardness, does not have noticeable curing shrinkage uevenness (that is, not recognized as abnormal appearance) and can meet market demands for an increased area and homogeneous properties, and an antireflection film using the anti-dazzling film. The present invention has been made based on such finding.

In one embodiment of the present invention, there is provided an anti-dazzling film for constituting an antireflection film comprising a low-refractive index layer, the anti-dazzling film comprising: a triacetylcellulose film; and an anti-dazzling layer provided on the triacetylcellulose film, the anti-dazzling layer comprising plastic light transparent fine particles, a leveling agent comprising a copolymer comprising (meth)acrylic acid repeating units containing at least one perfluoroalkyl group having 8 or more carbon atoms and (meth)acrylic acid repeating units having at least one bornane ring, and a curing composition comprising light transparent ionizing radiation curing polyfunctional resins at least one of which comprises a trifunctional acrylic resin, wherein the low-refractive index layer having a lower refractive index than the refractive index of the anti-dazzling layer is provided on the anti-dazzling layer.

In another embodiment of the present invention, there is provided an antireflection film comprising: a triacetylcellulose film; an anti-dazzling layer; and a low-refractive index layer having a lower refractive index than the refractive index of the anti-dazzling layer provided in that order on the triacetylcellulose film, the anti-dazzling layer comprising plastic light transparent fine particles, a leveling agent comprising a copolymer comprising (meth)acrylic acid repeating units containing at least one perfluoroalkyl group having 8 or more carbon atoms and (meth)acrylic acid repeating units having at least one bornane ring, and a curing composition comprising light transparent ionizing radiation curing polyfunctional resins at least one of which comprises a trifunctional acrylic resin.

DETAILED DESCRIPTION OF THE INVENTION

First Aspect of the Present Invention

Figure 1:
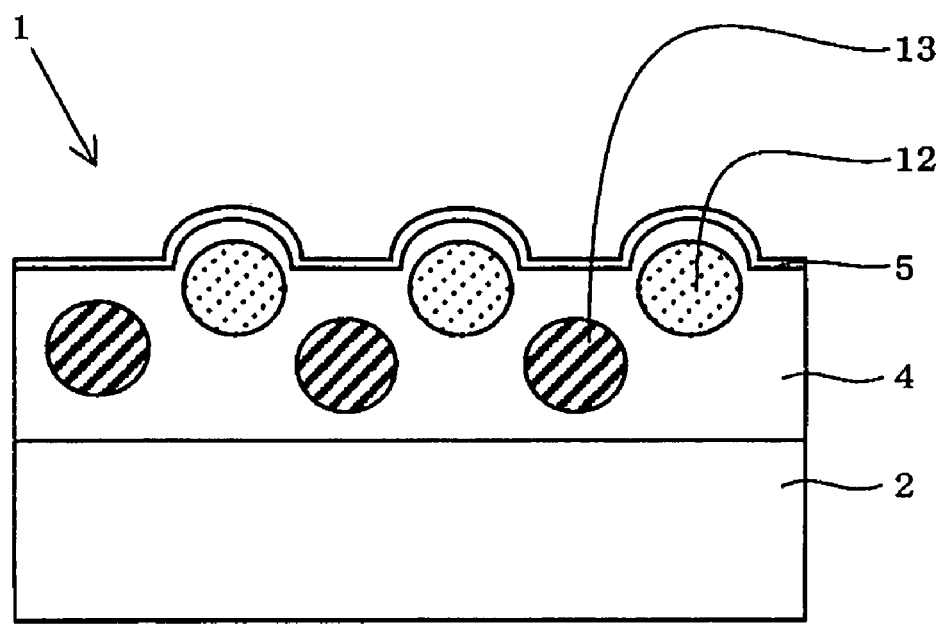
FIG. 1 is a cross-sectional view of an antireflection film according to the present invention.
Figure 2:
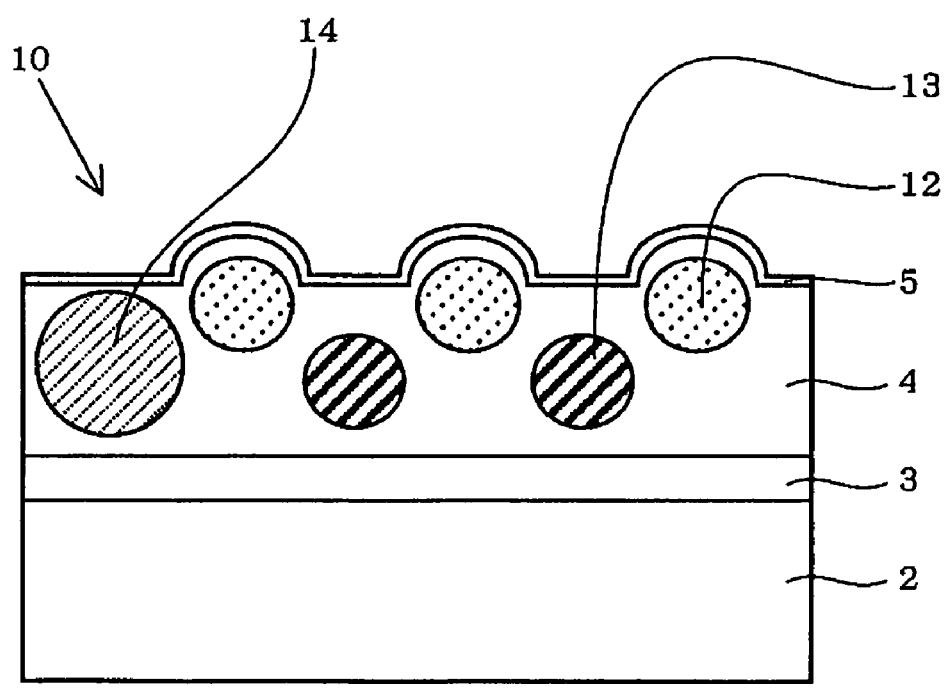
FIG. 2 is a cross-sectional view of an antireflection film with an antistatic layer according to the present invention.

The anti-dazzling film and antireflection film according to the first aspect of the present invention will be described with reference to FIGS. 1 and 2. FIG. 1 and FIG. 2 are cross-sectional views showing a preferred embodiment of the antireflection film according to the first aspect of the present invention.

An antireflection film 1 shown in FIG. 1 has a layer construction comprising a triacetylcellulose film 2, an anti-dazzling layer 4, and a low-refractive index layer 5 stacked in that order. An antireflection film 10 shown in FIG. 2 comprises a triacetylcellulose film 2, an antistatic layer 3, an anti-dazzling layer 4, and a low-refractive index layer 5 stacked in that order. The anti-dazzling layer 4 comprises an acrylic resin as a light transparent resin and is preferably formed of a cured film having scratch resistance formed by curing an ionizing radiation curing-type light transparent resin. In the anti-dazzling layer 4, light transparent fine particles 12 for forming concaves and convexes are mainly contained in the surface of the anti-dazzling layer. Further, light transparent fine particles 13 not having concaves and convexes on its surface may be contained. Two or more types of light transparent fine particles are may be used. The low-refractive index layer 5 is coated as the outermost layer. The antistatic layer 3 is generally coated as a layer underlying the anti-dazzling layer 4. The position of the antistatic layer 3 is not limited to the position under the anti-dazzling layer 4 so far as the antistatic layer 3 is not provided as the outermost layer. The anti-dazzling layer 4 contains electrically conductive particles 14. When there is no need to provide the antistatic layer, the provision of the antistatic layer 3 may be omitted.

The refractive index of the cured film in its part other than the light transparent fine particles 12 or 13 contained in the anti-dazzling layer 4 is preferably in the range of 1.50 to 2.00, and the refractive index of the low-refractive index layer 5 is preferably in the range of 1.30 to 1.50. In the antireflection films shown in FIGS. 1 and 2, the laminate before the provision of the low-refractive index layer 5 is the anti-dazzling film according to the present invention.

1. Anti-dazzling Layer

In the present invention, the anti-dazzling layer is formed by coating a composition composed mainly of an acrylic resin as a light transparent resin, preferably an ionizing radiation curing-type light transparent resin of an acrylic resin for imparting hardcoat properties (scratch resistance), plastic light transparent fine particles for imparting anti-dazzling properties, and a leveling agent, and, if necessary, light transparent fine particles for imparting internal scattering properties and an inorganic filler for increasing the refractive index, preventing crosslinking shrinkage, and imparting high indentation strength, and curing the coating film.

Leveling Agent

In order to ensure evenness of planar appearance, that is, to ensure freedom from uneven fluidity, uneven drying, coating streaks, point defects and the like, even at the time of high speed coating, there is a proposal that fluoroleveling agents and/or silicone leveling agents are added to the coating composition for an anti-dazzling layer. The fluoroleveling agent is particularly preferred in that there is no significant fear that, when a cured film formed by coating a lower layer coating composition for an antireflection film is wound, the leveling agent is transferred onto the backside of the film, and, in addition, the leveling agent transfer contamination of a carrier roll within a manufacturing machine at the time of handling of the cured film takes place.

The use of the leveling agent, however, often poses a problem that functional groups containing fluorine or silicon atoms are segregated on the surface of the cured film and, consequently, surface free energy of the cured film becomes so low that, when the low-refractive index layer is overcoated onto the cured film, the reflectance and scratch resistance are deteriorated.

The reason why the reflectance and the scratch resistance are deteriorated is believed to reside in that, since wettability of the cured film of the anti-dazzling layer having lowered surface free energy by the coating composition for a low-refractive index layer is deteriorated, microscopic evenness of thickness of the low-refractive index layer, which is causative of a deterioration in reflectance, takes place. On the other hand, the reason why the scratch resistance is deteriorated is believed to reside in that the affinity and bonding power between the cured film as the anti-dazzling layer and the low-refractive index layer are lowered, resulting in significantly lowered adhesion at the interface of the cured film and the low-refractive index layer.

In the present invention, it was found that the following fluoroleveling agent is specifically effective as means for simultaneously realizing coating suitability (planar appearance and homogeneity of various properties) and scratch resistance.

The leveling agent used in the present invention comprises a copolymer comprising (meth)acrylic acid repeating units containing at least one perfluoroalkyl group having 8 or more carbon atoms and (meth)acrylic acid repeating units having at least one bornane ring. Preferably, (meth)acrylic acid repeating units containing a polyethylene oxide group or/and a polypropylene oxide group are contained in the leveling agent structure. When (meth)acrylic acid repeating units containing a polyethylene oxide group or/and a polypropylene oxide group are contained, the solubility in a coating solvent and compatibility with the solid content of the coating composition are advantageously increased.

The mass average molecular weight (Mw) in terms of polystyrene of the leveling agent used in the present invention is preferably not less than 1,300 and not more than 15,000. More preferably, the mass average molecular weight (Mw) in terms of polystyrene is not less than 2,500 from the viewpoints of planar appearance and the homogeneity of various properties and is not more than 13,000 from the viewpoints of solubility in a coating solvent and compatibility with the solid matter of the coating composition.

The content of the leveling agent used in the present invention is preferably not less than 0.05% by mass and not more than 0.5% by mass, more preferably not less than 0.08% by mass and not more than 0.30% by mass, based on the mass of solid matter of the cured film resin. When the content of the leveling agent is below the lower limit of the above-defined range, the planar appearance and homogeneity of various properties at the time of high speed coating are difficult to be realized. On the other hand, when the content of the leveling agent is above the upper limit of the above-defined range, disadvantageously, there is a fear that the scratch resistance is influenced by this and foams occurs during stirring of the coating liquid.

Further, when the leveling agent is used, a toluene solvent is preferably contained in an amount of not less than 25% by mass and not more than 60% by mass, more preferably not less than 30% by mass and not more than 55% by mass, still preferably not less than 35% by mass and not more than 50% by mass, based on the total amount of the coating composition for an anti-dazzling layer.

In the course of studies of the leveling agent used in the present invention, the present inventors have found that the effect can be attained most efficiently particularly in a toluene solvent among general-purpose solvents. The amount of the toluene solvent is preferably not below 25% by mass. On the other hand, when the transparent base material film is a cellulose acylate film and the solvent in the coating composition is composed of toluene only, the solubility of the transparent base material film in toluene is so low that the adhesion between the transparent base material film and the coating composition is less likely to be provided. From this viewpoint, the amount of toluene is preferably not above 60% by mass. In this case, solvents which may be preferably used in combination with toluene include cyclohexanone, methyl ethyl ketone, acetone, methyl acetate, and ethyl acetate. Cyclohexanone is particularly preferred.

Specific examples of the structure of the leveling agent used in the present invention, that is, P-1 to P-19, are shown in the following chemical formulae 1 to 3 and Tables 1 to 3. The structure is not limited to these only. In the formulae, numerals a to f are mass ratios for the respective monomer components. n, p and q are the average numbers of repeating units for respective repeating units. Mw represents the mass average molecular weight. In the following formulae, $R^1$, $R^2$, $R^3$, $R^4$, $R^5$ and $R^6$ represent a hydrogen atom or a methyl group, and $R^7$ represents a straight-chain, branched or cyclic substituted or unsubstituted alkyl group having 1 to 20 carbon atoms. Substituents for the alkyl group represented by $R^7$ include halogen atoms, for example, a fluorine atom and a chlorine atom, alkoxy groups having 1 to 8 carbon atoms, for example, methoxy, ethoxy, and butoxy, and a hydroxyl group.

The mass average molecular weight is the molecular weight in terms of polystyrene as determined by a GPC analyzer with a column of TSKgel GMHxL, TSKgel G4000HxL and TSKgel G2000HxL (tradenames; all of the above products being manufactured by Tosoh Corporation) by detection with a differential refractometer using THF as a solvent and are calculated using peaks for components having a molecular weight of not less than 300.

TABLE 1

Chemical formula 1

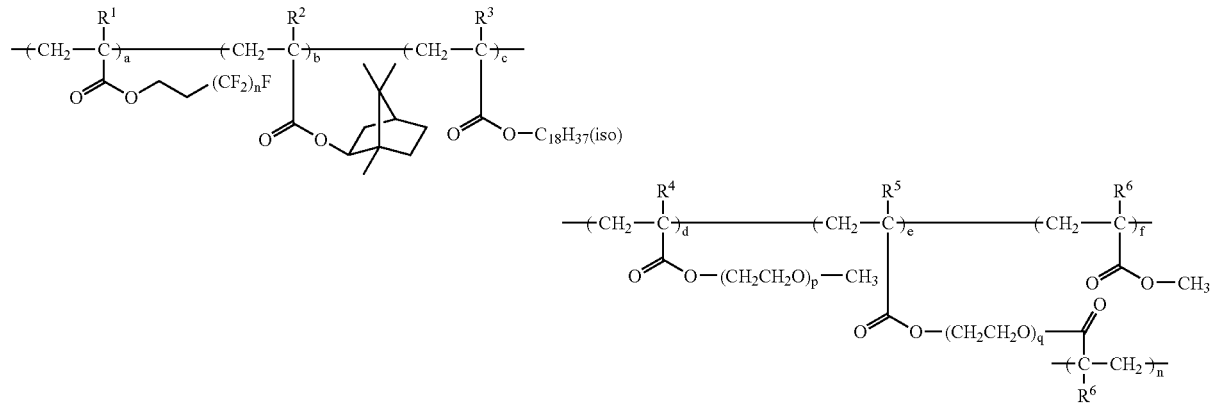

| | $R^1$ | $R^2$ | $R^3$ | $R^4$ | $R^5$ | $R^6$ | n | p | q | a | b | c | d | e | f | Mw |
|---|---|---|---|---|---|---|---|---|---|---|---|---|---|---|---|---|
| P-1 | H | H | H | $CH_3$ | $CH_3$ | $CH_3$ | 8 | 9 | 1 | 40 | 15 | 5 | 30 | 2 | 8 | 2500 |
| P-2 | H | H | H | $CH_3$ | $CH_3$ | $CH_3$ | 8 | 9 | 1 | 20 | 25 | 10 | 20 | 2 | 23 | 4000 |
| P-3 | H | H | H | $CH_3$ | $CH_3$ | $CH_3$ | 8 | 9 | 2 | 30 | 20 | 10 | 25 | 3 | 12 | 8000 |

TABLE 1-continued

Chemical formula 1

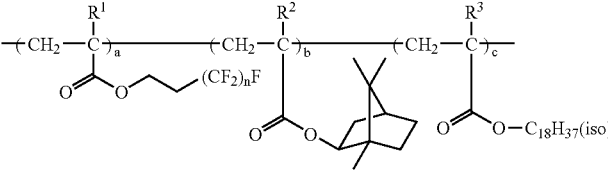

| | R¹ | R² | R³ | R⁴ | R⁵ | R⁶ | n | p | q | a | b | c | d | e | f | Mw |
|---|---|---|---|---|---|---|---|---|---|---|---|---|---|---|---|---|
| P-4 | H | H | H | CH₃ | CH₃ | CH₃ | 8 | 9 | 4 | 35 | 20 | 10 | 20 | 3 | 12 | 3000 |
| P-5 | H | H | H | CH₃ | CH₃ | CH₃ | 8 | 9 | 9 | 35 | 15 | 6 | 30 | 4 | 10 | 5000 |
| P-6 | H | CH₃ | H | CH₃ | CH₃ | CH₃ | 8 | 4 | 2 | 25 | 10 | 15 | 15 | 3 | 32 | 15000 |
| P-7 | CH₃ | CH₃ | H | H | CH₃ | CH₃ | 10 | 9 | 1 | 30 | 20 | 7 | 20 | 3 | 20 | 5000 |

TABLE 2

Chemical formula 2

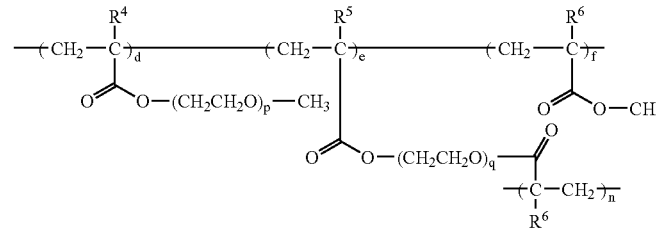

| | R⁴ | R⁶ | n | p | R⁷ | a | b | d | f | Mw |
|---|---|---|---|---|---|---|---|---|---|---|
| P-8 | H | CH₃ | 8 | 9 | C₄H₉(n) | 25 | 35 | 15 | 25 | 6000 |
| P-9 | CH₃ | H | 8 | 4 | CH₂CH(C₂H₅)C₄H₉(n) | 35 | 15 | 40 | 10 | 1300 |
| P-10 | CH₃ | CH₃ | 10 | 9 | CH₃ | 40 | 20 | 15 | 25 | 9000 |
| P-11 | H | CH₃ | 8 | 9 | CH₂CH₂OH | 35 | 30 | 20 | 15 | 3000 |
| P-12 | H | H | 10 | 4 | C₁₂H₂₅(n) | 30 | 15 | 35 | 20 | 2000 |

TABLE 3

Chemical formula 3

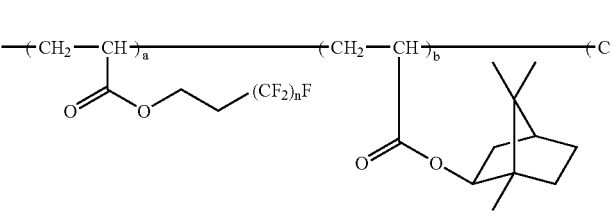

| | R¹ | R² | R⁶ | n | R⁷ | a | b | f | Mw |
|---|---|---|---|---|---|---|---|---|---|
| P-13 | H | CH₃ | CH₃ | 8 | C₄H₉(t) | 40 | 35 | 25 | 5000 |
| P-14 | CH₃ | H | H | 10 | (C₃H₆O)₆H | 20 | 50 | 30 | 4000 |
| P-15 | CH₃ | CH₃ | H | 8 | C₆H₁₃(n) | 30 | 40 | 30 | 8000 |
| P-16 | CH₃ | CH₃ | H | 8 | (CH₂CH₂O)₉CH₃ | 35 | 30 | 35 | 3000 |
| P-17 | H | H | CH₃ | 10 | CH₃ | 25 | 15 | 60 | 4000 |
| P-18 | CH₃ | H | — | 8 | — | 30 | 70 | 0 | 3000 |
| P-19 | H | H | — | 8 | — | 40 | 60 | 0 | 5000 |

R-30 (commercially available product) manufactured by Dainippon Ink and Chemicals, Inc. may be mentioned as a preferred example of a commercially available leveling agent in the present invention.

Transparent Resin Comprising Acrylic Resin

An ionizing radiation curing-type light transparent resin comprising an acrylic resin for imparting hardcoat properties (scratch resistance) may be mentioned as a preferred example of the light transparent resin comprising an acrylic resin. Specific examples of preferred ionizing radiation curing resin compositions comprising an acrylic resin include resins having an acrylate functional group, and examples thereof include relatively low-molecular weight polyester resins, polyether resins, acrylic resins, epoxy resins, urethane resins, alkyd resins, spiroacetal resins, polybutadiene resins, and polythiol-polyene resins, oligomers or prepolymers of (meth) acrylates of polyfunctional compounds such as polyhydric alcohols (in the present specification, acrylate and methacrylate will be hereinafter referred to as "(meth)acrylate"), and ionizing radiation curing resins containing a relatively large amount of a reactive diluent.

Examples of diluents include monofunctional monomers, for example, ethyl (meth)acrylate, 2-ethylhexyl (meth)acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

The amount of the ionizing radiation curing-type resin composition in the anti-dazzling layer is not less than 15% by mass and not more than 85% by mass based on the total mass of the solid matter of the anti-dazzling layer.

When the ionizing radiation curing resin is used as the ultraviolet curing resin, a photopolymerization initiator may be mixed in the ionizing radiation curing resin. Examples of photopolymerization initiators include acetophenones, benzophenones, Michler's benzoyl benzoate, α-amyloxime esters, and thioxanthones. Further, a photosensitizer may be mixed in the ionizing radiation. Examples of photosensitizers include n-butylamine, triethylamine, and tri-n-butylphosphine. In the present invention, mixing of urethane acrylate as an oligomer and dipentaerythritol hexa(meth)acrylate as a monomer is preferred.

Various examples, which are useful in the present invention, are also described in Saishin UV Koka Gijutsu (Advanced UV Curing Technique) (p. 159, publisher; Kazuhiro Takausu, publishing office: TECHNICAL INFORMATION INSTITUTE CO., LTD., published in 1991).

Examples of preferred commercially available photocleaving-type photoradical polymerization initiators include Irgacure 651 (tradename), Irgacure 184 (tradename), and Irgacure 907 (tradename) manufactured by Ciba Specialty Chemicals, K.K.

The amount of the photopolymerization initiator used is preferably in the range of 0.1 to 15 parts by mass, more preferably 1 to 10 parts by mass, based on 100 parts by mass of the polyfunctional monomer.

The light transparent resin for the formation of the anti-dazzling layer may comprise the above ionizing radiation curing-type resin containing a solvent drying-type resin. For example, phenol resins, urea resins, diallyl phthalate resins, melamine resins, guanamine resins, unsaturated polyester resins, polyurethane resins, epoxy resins, aminoalkyd resins, melamine-urea co-condensed resins, silicone resins, and polysiloxane resins may be used as the solvent drying-type resin.

The solvent drying-type thermoplastic resin added to the ionizing radiation curing-type resin may be of a conventional type. Cellulosic resins, for example, nitrocellulose, acetylcellulose, cellulose acetate propionate, and ethylhydroxyethylcellulose are advantageous as the solvent drying-type resin contained in the ionizing radiation curing-type resin from the viewpoints of adhesion to the triacetylcellulose film and transparency.

The ionizing radiation curing-type resin composition can be cured by a conventional method for curing the ionizing radiation curing-type resin composition, that is, by irradiation with an electron beam or ultraviolet light. For example, in the case of electron beam curing, electron beams having an energy of 50 to 1000 KeV, preferably 100 to 300 KeV, emitted from various electron beam accelerators, for example, Cockcroft-Walton, van de Graaff, resonance transformer, insulated core transformer, linear, dynamitron, and high-frequency electron beam accelerators may be used. On the other hand, in the case of ultraviolet curing, for example, ultraviolet light emitted from light sources such as ultrahigh pressure mercury lamps, high pressure mercury lamps, low pressure mercury lamps, carbon arc, xenon arc, and metal halide lamps, may be utilized.

Plastic Light Transparent Fine Particles

The anti-dazzling layer comprises plastic light transparent fine particles (hereinafter often referred to simply as "transparent fine particles") from the viewpoints of 1) forming concaves and convexes on its surface to impart anti-dazzling properties and 2) reducing glare (which is such a phenomenon that the surface concaves and convexes function as a lens and, particularly in the case of high-definition displays having a small pixel size, causes a variation in luminance resulting in lowered visibility), which is unfavorable in the anti-dazzling film, utilizing internal scattering derived from a difference in refractive index between the matrix and the fine particles (the larger the refractive index difference, the larger the internal scattering).

The difference in refractive index between the light transparent resin contained in the anti-dazzling layer (matrix resin for anti-dazzling layer) and the plastic light transparent fine particles is preferably not less than 0.03 and not more than 0.20, more preferably 0.04 to 0.16, because, when the refractive index difference is in the above-defined numerical range, the light scattering effect is satisfactory and there is no fear that the whole film is whitened.

In the light transparent fine particles, the use of light transparent fine particles having two or more different types of refractive indexes is preferred. When the light transparent fine particles having two or more different types of refractive indexes are mixed together, the average corresponding to the refractive index and proportion of use of the individual light transparent fine particles can be regarded as the refractive index of the mixed light transparent fine particles. Therefore, the refractive index can be more closely regulated by varying the mixing ratio of the light transparent fine particles, and the regulation of the refractive index of the light transparent fine particles is easier than the case where one type of light transparent fine particles is used. By virtue of this, various designs become possible.

The reason why the difference in refractive index between the first light transparent fine particles and the second light transparent fine particles in the light transparent fine particles is preferably not less than 0.03 and not more than 0.10 is that, when the refractive index difference is less than 0.03, the difference in refractive index between the two types of light transparent fine particles is so small that the degree of freedom of the regulation of the refractive index by mixing the two types of light transparent fine particles is small. On the other hand, when the refractive index difference is larger than 0.10, the light diffusivity is disadvantageously determined by the light transparent fine particles having a larger refractive index difference from that of the matrix. The refractive index difference is more preferably not less than 0.04 and not more than 0.09, particularly preferably not less than 0.05 and not more than 0.08.

Organic fine particles are preferred as first light transparent fine particles to be contained in the anti-dazzling layer, and particularly preferred fine particles are such that the transparency is high and the difference in refractive index between the fine particles and the light transparent resin is the above-described numerical value.

For example, acryl-styrene copolymer beads (refractive index 1.55), melamine beads (refractive index 1.57), and polycarbonate beads (refractive index 1.57) may be mentioned as organic fine particles usable in the first light transparent fine particles.

Organic fine particles are preferred as the second light transparent fine particles. The second light transparent fine particles are preferably such that the transparency is light and the difference in refractive index between the fine particles and the light transparent resin is the above-described numerical value. For example, styrene beads (refractive index 1.60) and polyvinyl chloride beads (refractive index 1.60) are usable as the second organic fine particles.

In the preferred embodiment of the present invention, in the two or more types of plastic light transparent fine particles, at least one type of plastic light transparent fine particles has a refractive index of not less than 1.53 and not more than 1.57, and another at least one type of plastic light transparent fine particles has a refractive index of not less than 1.58 and not more than 1.62.

The mixing ratio between the first light transparent fine particles and the second light transparent fine particles may be freely selected by rendering the particle diameter of the first light transparent fine particles and the second light transparent fine particles uniform. In order to render the particle diameter of the first light transparent fine particles and the second light transparent fine particles uniform, organic fine particles which can easily provide monodisperse particles are preferred. The lower the level of unevenness of the particle diameters, the smaller the variation in the anti-dazzling properties and internal scattering properties and advantageously the easier the optical performance design of the anti-dazzling layer. Means for further enhancing the monodispersivity include wind force classification and wet filtration classification using a filter.

The particle diameter of the light transparent fine particles is preferably not less than 0.5 μm and not more than 10.0 μm. When the particle diameter is less than 1.0 μm, satisfactory anti-dazzling properties and light diffusive effect cannot be attained without the addition of a very large amount of the light transparent fine particles to the anti-dazzling layer. When the particle diameter exceeds more than 10.0 μm, the surface shape of the anti-dazzling layer is rough, disadvantageously leading to deteriorated image quality and, at the same time, increased whiteness as a result of increased surface haze. The diameter of the light transparent fine particles is preferably not less than 2 μm and not more than 5 μm, particularly preferably not less than 2 μm and not more than 4 μm.

The total content of the light transparent fine particles is preferably not less than 5% by mass and not more than 40% by mass, more preferably not less than 10% by mass and not more than 30% by mass, based on the total mass of the solid matter of the anti-dazzling layer. When the total content of the light transparent fine particles is less than 5% by mass, satisfactory anti-dazzling properties and internal scattering properties cannot be imparted. On the other hand, when the total content exceeds 40% by mass, disadvantageously, the layer structure is lowered and, consequently, hardcoat properties cannot be imparted to the anti-dazzling layer.

Inorganic Filler

When the amount of light transparent fine particles added is large, the light transparent fine particles are likely to settle in the resin composition. To prevent this unfavorable phenomenon, inorganic fillers such as silica may be added. The larger the amount of the inorganic filler added, the better the effect of preventing the settlement of the light transparent fine particles. In some particle diameter and addition amount, however, the inorganic filler adversely affects the transparency of the coating film. Accordingly, preferably, an inorganic filler having a particle diameter of not more than 0.5 μm is incorporated in the light transparent resin in such an amount that the transparency of the coating film is not sacrificed.

Thus, the anti-dazzling layer according to the present invention may contain any desired component such as an inorganic filler. In order to enhance the refractive index of the layer, preferably, an inorganic filler, which comprises an oxide of at least one metal selected from the group consisting of titanium, zirconium, aluminum, indium, zinc, tin, and antimony and has an average particle diameter of not more than 0.2 μm, preferably not more than 0.1 μm, more preferably not more than 0.06 μm, is contained in the anti-dazzling layer.

In order to increase a refractive index difference from the light transparent fine particles, it is also preferred to use silicon oxide to maintain the refractive index of the layer at a low value in the anti-dazzling layer using the high-refractive index light transparent fine particles. The particle diameter is preferably the same as that of the above inorganic filler.

Specific examples of the inorganic filler used in the anti-dazzling layer include $TiO_2$, $ZrO_2$, $Al_2O_3$, $In_2O_3$, $ZnO$, $SnO_2$, $Sb_2O_3$, ITO and $SiO_2$. $TiO_2$ and $ZrO_2$ are particularly preferred from the viewpoint of high-refractive index. The silane coupling treatment or titanium coupling treatment of the surface of the inorganic filler is also preferred. In this case, a surface treatment agent capable of imparting, to the filler surface, a functional group reactive with the binder resin is preferred.

The addition amount of the inorganic filler is preferably 10 to 90% by mass, more preferably 20 to 80%, particularly preferably 30 to 75%, based on the total mass of the solid matter of the anti-dazzling layer. Since the particle diameter of the filler is satisfactorily smaller than the wavelength of light, scattering does not occur and a dispersion comprising the filler dispersed in the binder polymer acts as an optically homogeneous material.

The refractive index of a bulk of a mixture of a light transparent resin binder, light transparent fine particles, and an inorganic filler, that is, the refractive index of a matrix of the anti-dazzling layer, in the anti-dazzling layer according to the present invention is preferably 1.48 to 2.00, more preferably 1.51 to 1.80, still preferably 1.54 to 1.70. The refractive index of a matrix of the anti-dazzling layer, that is, the refractive index of the anti-dazzling layer in its part excluding the light transparent fine particles, is preferably 1.50 to 2.00. When the refractive index is in the above-defined range, the type and amount ratio of the binder, light transparent fine particles and/or inorganic filler may be properly selected.

The above construction is advantageous in that the selection of a proper difference in refractive index between the light transparent fine particles and the anti-dazzling layer matrix can provide optimal anti-dazzling properties without whitening of the whole film in such a state that a high level of transmission sharpness is maintained, and, at the same time, can average the light passed through within the film by the internal scattering effect to suppress glaring.

Organosilane Compound

When the incorporation of an organosilane compound according to the present invention is preferred, the details of the organosilane compound added may be the same as those of organosilane compounds which will be described later.

Formation of Anti-dazzling Layer

When the anti-dazzling layer is formed by a crosslinking reaction or a polymerization reaction of an ionizing radiation curing-type compound, the crosslinking reaction or polymerization reaction is preferably carried out in an atmosphere having an oxygen concentration of not more than 10% by volume. When the anti-dazzling layer is formed in an atmosphere having an oxygen concentration of not more than 10% by volume, the formed anti-dazzling layer has excellent hardcoat properties (scratch resistance), that is, excellent physical strength and chemical strength.

Preferably, the anti-dazzling layer is formed by a crosslinking reaction or polymerization reaction of an ionizing radiation curing-type compound in an atmosphere having an oxygen concentration of not more than 3% by volume. The oxygen concentration is more preferably not more than 1% by volume, particularly preferably not more than 0.2% by volume, most preferably not more than 0.1% by volume.

The oxygen concentration is preferably brought to not more than 10% by volume by replacing the atmospheric air (nitrogen concentration about 79% by volume, oxygen concentration about 21% by volume) with another gas, particularly preferably by replacing the atmospheric air with nitrogen (nitrogen purge).

Properties of Anti-dazzling Layer

The haze of the anti-dazzling layer is preferably not less than 10% and not more than 70%, more preferably not less than 20% and not more than 60%, still preferably not less than 30% and not more than 50%. When the haze is less than 10%, satisfactory anti-dazzling properties and internal scattering properties cannot be imparted. On the other hand, when the haze exceeds 70%, disadvantageously, the whole film is whitened and the display image also blurs.

The thickness of the anti-dazzling layer is preferably 1 to 10 μm, more preferably 2 to 9 μm, particularly preferably 3 to 8 μm. When the thickness is smaller than 1 μm, the indentation strength (pencil hardness) is noticeably lowered. On the other hand, when the thickness is more than 10 μm, the level of curling is increased, although the curling level also varies depending upon curing shrinkage of the binder, and, consequently, the handleability and processability are deteriorated.

The strength of the anti-dazzling layer is preferably H or more, still preferably 2H or more, most preferably 3H or more, as determined by a pencil hardness test specified in JIS K 5400. In a Taber test specified in JIS K 5400, the smaller the abrasion amount of the test determined by determining a difference in mass between the test piece before the test and the test piece after the test, the better the strength.

2. Low-referactive Index Layer

In the present invention, there is provided an antireflection laminate comprising a low-refractive index layer provided on the anti-dazzling layer. The refractive index of the low-refractive index layer in the antirefleciton film is preferably 1.30 to 1.50, more preferably 1.30 to 1.45. A lower refractive index is preferred from the viewpoint of lowering the reflectance. When the refractive index is lower than 1.30, however, the strength of the low-refractive index layer is unsatisfactory and, thus, the formed antireflection film is unfavorable as an antireflection film used in the outermost surface.

Further, from the viewpoint of lowering the refractive index, preferably, the low-refractive index layer satisfies numerical formula (1):

$$(m/4) \times 0.7 < n_1 d_1 < (m/4) \times 1.3 \qquad (1)$$

wherein m is a positive odd number;

$n_1$ represents the refractive index of the low-refractive index layer;

$d_1$ represents the thickness of the low-refractive index layer, nm; and $\lambda$ represents wavelength which is a value in the range of 500 to 550 nm.

The wording "satisfying numerical formula (1)" means that, in the above wavelength range, m (a positive number which is generally 1) satisfying numerical formula (1) exists.

A fluorine-containing sol-gel material or a fluoropolymer material is used as a low-refractive index binder in the low-refractive index layer according to the present invention. The fluorine-containing sol-gel material is preferably a fluoropolymer material for the reason that the step of heating for a long period of time necessary for a sol-gel curing reaction is necessary and, in addition, alkaline resistance cannot be attained. A fluoropolymer material, which has a coefficient of dynamic friction of 0.05 to 0.30 and a contact angle with water of 90 to 120° and is crosslinkable upon exposure to heat or an ionizing radiation, is particularly preferred. For the fluoropolymer material, reference may be made to paragraph numbers [0027] and [0028] in Japanese Patent Laid-Open No. 202402/2002, and compounds used in the working example of this publication are also preferred.

Incorporating inorganic fine particles in the low-refractive index layer according to the present invention is preferred from the viewpoints of enhancing the strength of the low-refractive index layer per se and improving the scratch resistance.

The coverage of the inorganic fine particles is preferably 1 mg/m$^2$ to 100 mg/m$^2$, more preferably 5 mg/m$^2$ to 80 mg/m$^2$, still preferably 10 mg/m$^2$ to 60 mg/m$^2$. When the coverage of the inorganic fine particles is below the lower limit of the above-defined coverage range, the effect of improving the scratch resistance is small. On the other hand, when the amount of the coverage of the inorganic fine particles is above the upper limit of the above-defined coverage range, fine concaves and convexes are formed on the surface of the low-refractive index layer and, consequently, appearance such as sharpness of black color and reflectance are disadvantageously deteriorated.

The inorganic fine particles are contained in the low-refractive index layer and, hence, preferably have a low refractive index. Examples thereof include fine particles of magnesium fluoride and silica. Silica fine particles are preferred from the viewpoints of refractive index, dispersion stability, and cost. The average particle diameter of the silica fine particles is preferably not less than 10% and not more than 100%, more preferably not less than 20% and not more than 90%, particularly preferably not less than 30% and not more than 80%, of the thickness of the low-refractive index layer. That is, when the thickness of the low-refractive index layer is 100 nm, the particle diameter of the silica fine particles is preferably not less than 10 nm and not more than 100 nm, more preferably not less than 20 nm and not more than 90 nm, still preferably not less than 30 nm and not more than 80 nm.

When the particle diameter of the silica fine particles is below the lower limit of the above-defined range, the effect of improving the scratch resistance is reduced. On the other hand, when the particle diameter of the silica fine particles is above the upper limit of the above-defined range, fine concaves and convexes are formed on the surface of the low-refractive index layer and, consequently, the appearance such as sharpness of black color and reflectance are deteriorated. The silica fine particles may be either crystalline or amorphous. Further, the silica fine particles may be monodisperse particles, or alternatively may be agglomerated particles so far as they satisfy a predetermined particle diameter requirement. The shape is most preferably spherical, and no problem occurs even when the shape is irregular. The average particle diameter of the inorganic fine particles is measured with a Coulter counter.

Organosilane Compound

The low-refractive index layer according to the present invention preferably contains an organosiliane compound which will be described later.

3. Triacetylcellulose Film

The thickness of the triacetylcellulose film (TAC film) is generally about 25 μm to 100 μm, preferably 30 μm to 100 μm, particularly preferably 35 μm to 100 μm. When the thickness of the triacetylcellulose film is less than 25 μm, this film is difficult to handle during film formation. A thickness exceeding 100 μm is disadvantageous from the viewpoint of reducing the thickness of displays.

4. Antistatic Layer

In the present invention, preferably, an antistatic layer (an electrically conductive layer) is provided. The antistatic layer comprises an electrically conductive material dispersed in a reactive curing-type resin, and electrically conductive materials include, for example, electrically conductive fine particles, for example, antimony-doped indium tin oxide (hereinafter referred to as "ATO") and indium tin oxide (hereinafter referred to as "ITO") and/or organic compound fine particles subjected to surface treatment with gold and/or nickel.

In a preferred embodiment of the present invention, there is provided an anti-dazzling film comprising an antistatic layer, which is provided between a triacetylcellulose film and an anti-dazzling layer and comprises at least an ionizing radiation curing-type resin and an electrically conductive material, and electrically conductive particles contained in the anti-dazzling layer, for ensuring continuity between the antistatic layer and the outermost surface of the anti-dazzling film. The electrically conductive particles may be the same as the above electrically conductive material.

The reactive curing-type resin is not particularly limited so far as it has good adhesion to the transparent base material film, is resistant to light and moisture, and has good adhesion to the anti-dazzling layer formed on the antistatic layer. Examples of reactive curing-type resins include resins which cause a crosslinking polymerization reaction upon exposure to ultraviolet light or electron beams and consequently is converted to a three-dimensional polymer structure, that is, an ionizing radiation curing-type resin comprising a material prepared by properly mixing polymerizable unsaturated bond or epoxy group-containing reactive prepolymer, oligomer and/or monomer (the polymerizable unsaturated bond or epoxy group being contained in the molecule thereof), or a mixture of the above ionizing radiation curing-type resin, in which thermoplastic resins such as urethane, polyester, acrylic, butyral, or vinyl thermoplastic resins have if necessary been mixed from the viewpoint of suitability for coating and the like.

Organosilane Compound

The antistatic layer according to the present invention preferably contains an organosilane compound which will be described later.

Formation of Antistatic Layer

A coating film as the antistatic layer may be formed by coating a liquid composition of the above resin, to which electrically conductive fine particles have been dispersed, by a well-known coating method such as roll coating, bar coating, or gravure coating, drying the coating, and curing the dried coating. Light sources such as ultrahigh pressure mercury lamps, high pressure mercury lamps, low pressure mercury lamps, carbon arc lamps, blacklight fluorescent lamps, and metal halide lamps may be used as an ultraviolet light source for curing. The ultraviolet light may be in a wavelength range of 190 to 380 nm. Specific examples of electron beam sources include various electron beam accelerators, for example, Cockcroft-Walton, van de Graaff, resonance transformer, insulated core transformer, linear, dynamitron, and high-frequency electron beam accelerators.

Preferably, the ionizing radiation curing-type resin specifically contains an acrylate functional group. When the hardness and heat resistance, solvent resistance, and scratch resistance of the coating film are taken into consideration, the formation of a structure having high crosslinking density is preferred. Examples thereof include bi- or higher functional acrylate monomers, for example, ethylene grycol di(meth) acrylate, 1,6-hexanediol diacrylate, trimethylolpropane tri(meth)acrylate, pentaerythritol tri(meth)acrylate, dipentaerythritol penta(meth)acrylate, and dipentaerythritol hexa(meth)acrylate. In the above compounds, (meth)actylate refers to acrylate and/or methacrylate.

The ionizing radiation curing-type resin is satisfactorily cured upon exposure to electron beams. When the ionizing radiation curing resin is cured by ultraviolet irradiation, a photopolymerization initiator may be mixed in the ionizing radiation curing resin. Examples of photopolymerization initiators include acetophenone, benzophenone, thioxanthone, benzoin, benzoin methyl ether, Michler's benzoyl benzoate, Michier's ketone, diphenyl sulfide, dibenzyl disulfide, diethyl oxide, triphenylbiimidazole, isopropyl-N, and N-dimethylaminobenzoate. Further, a photosensitizer may be mixed in the ionizing radiation. Examples of photosensitizers include n-butylamine, triethylamine, and tri-n-butylphosphine. They may be used either solely or as a mixture of two or more. The addition amount of the photopolymerization initiator or photosensitizer added is generally about 0.1 to 10 parts by weight based on 100 parts by weight of the ionizing radiation curing resin.

When a coating film as the antistatic layer is formed, the thickness is preferably such that the surface resistivity of the antistatic layer is not more than $1 \times 10^{12}$ Ω/☐. The thickness of the antistatic layer is generally 0.3 to 3.5 μm, preferably 0.7 to 2.8 μm. When the thickness is less than 0.3 μm, it is difficult to bring the surface resistivity of the transparent electrically conductive layer 3 to not more than $1 \times 10^{12}$ Ω/☐. On the other hand, when the thickness exceeds 3.5 μm, there is a fear of causing loss of the transparency of the antistatic layer.

Particles subjected to surface treatment with gold and/or nickel may be used as electrically conductive particles 14 contained in the anti-dazzling layer (4 in FIG. 2). Particles before the surface treatment may be selected from the group consisting of silica, carbon black, metal particles and resin particles.

5. Organosilane Compound

In a preferred embodiment of the present invention, the anti-dazzling layer, low-refractive index layer or antistatic layer contains an organosilane compound.

In the anti-dazzling layer, antistatic layer, and low-refractive index layer for an antireflection film according to the present invention, from the viewpoint of further improving the scratch resistance, preferably, an organosilane compound represented by the following general formula and/or its hydrolyzate and/or its partial condensate is incorporated 1) in at least a coating liquid for the formation of a low-refractive index layer or for the formation of a layer adjacent to the low-refractive index layer, more preferably 2) in a coating liquid for the formation of a low-refractive index layer and a coating liquid for the formation of a layer adjacent to the low-refractive index layer, most preferably 3) in coating liquids for all respective layers. This component, after the coating liquid is coated, is subjected to the step of drying to remove the solvent and the step of curing to form a cured product which becomes a part of the binder in the above layer.

When the cured product contains a polymerizable unsaturated bond, upon exposure to an actinic radiation, a binder having a three-dimensional structure is formed. The organosilane compound is represented by general formula [I]:

$$(R^{10})_m Si(X)_{4-m} \quad [I]$$

In the above formula, $R^{10}$ represents a hydrogen atom, a substituted or unsubstituted alkyl group, or a substituted or unsubstituted aryl group. The number of carbon atoms in the alkyl group is preferably 1 to 30, more preferably 1 to 16, particularly preferably 1 to 6. Examples of alkyl groups include methyl, ethyl, propyl, isopropyl, hexyl, decyl, and hexadecyl. The number of carbon atoms in the aryl group is preferably 6 to 30, more preferably 6 to 16, particularly preferably 6 to 10. Examples of aryl groups include phenyl and naphthyl, and phenyl is preferred.

X represents a hydroxyl group or a hydrolyzable group. Preferred are alkoxy groups, preferably alkoxy groups having 1 to 5 carbon atoms, for example, methoxy and ethoxy groups, halogen atoms, for example, Cl, Br, and I, and a group represented by $R^2COO$, wherein $R^2$ represents a hydrogen atom or an alkyl group having 1 to 5 carbon atoms, for example, $CH_3COO$ and $C_2H_5COO$. Alkoxy groups are preferred, and a methoxy or ethoxy group is particularly preferred.

m is an integer of 1 to 3, preferably 1 or 2, particularly preferably 1.

When a plurality of $R^{10}$'s are present, the plurality of $R^{10}$'s may be the same or different. When a plurality of X's are present, the plurality of X's may be the same or different.

The substituent contained in $R^{10}$ is not particularly limited, and examples thereof include halogen atoms, for example, fluorine, chlorine, and bromine atoms, a hydroxyl group, a mercapto group, a carboxyl group, an epoxy group, alkyl groups, for example, methyl, ethyl, i-propyl, propyl, and t-butyl groups, aryl groups, for example, phenyl and naphthyl groups, aromatic heterocycle groups, for example, furyl, pyrazolyl, and pyridyl groups, alkoxy groups, for example, methoxy, ethoxy, i-propoxy, and hexyloxy groups, aryloxy groups, for example, a phenoxy group, alkylthio groups, for example, methylthio and ethylthio groups, arylthio groups, for example, a phenylthio group, alkenyl groups, for example, vinyl and 1-propenyl groups, acyloxy groups, for example, acetoxy, acryloyloxy, and methacryloyloxy groups, alkoxycarbonyl groups, for example, methoxycarbonyl and ethoxycarbonyl groups, aryloxycarbonyl groups, for example, a phenoxycarbonyl group, carbamoyl groups, for example, carbamoyl, N-methylcarbamoyl, N,N-dimethylcarbamoyl, and N-methyl-N-octylcarbamoyl groups, and acylamino groups, for example, acetylamino, benzoylamino, acrylamino, and methacrylamino groups. These substituents may be further substituted.

$R^{10}$ preferably represents an alkyl or aryl group containing a crosslinkable reactive group. Among others, an alkyl group containing an epoxy or (meth)acryloyl group is particularly preferred from the viewpoint of realizing three-dimensional crosslinking. Particularly preferred commerically available products include KBM-403 (3-glycidoxypropyltrimethoxysilane), KBM-503 (3-methacryloxypropyltrimethoxysilane), and KBM-5103 (3-acryloxypropyltrimethoxysilane) [all the above products being manufactured by The Shin-Etsu Chemical Co., Ltd.].

Specific examples of the structure of organosilane compounds used in the present invention include, but are not limited to, the following structures:

Chemical formula 4

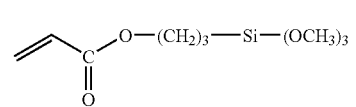

M-1

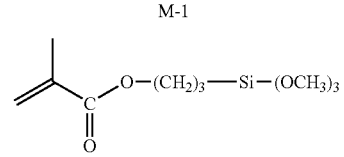

M-2

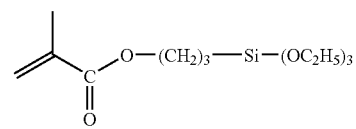

M-3

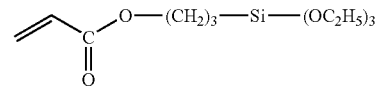

M-4

Chemical formula 5

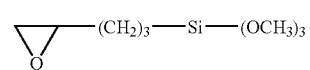

M-5

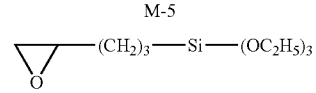

M-6

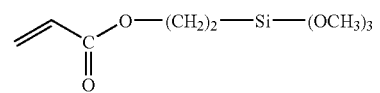

M-7

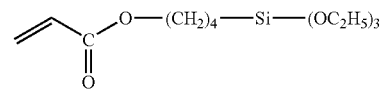

M-8

-continued

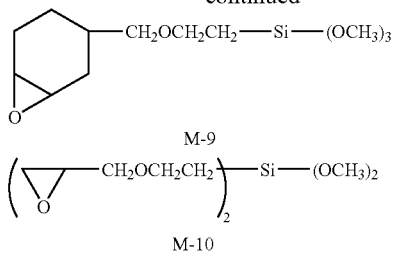

M-9

M-10

Among them, (M-1), (M-2), and (M-5) are particularly preferred. The hydrolysis reaction and/or condensation reaction of the organosilane is generally carried out in the presence of a catalyst. Catalysts include inorganic acids such as hydrochloric acid, sulfuric acid, and nitric acid; organic acids such as oxalic acid, acetic acid, formic acid, methanesulfonic acid, and toluenesulfonic acid; inorganic bases such as sodium hydroxide, potassium hydroxide, and ammonia; organic bases such as triethylamine and pyridine; metal alkoxides such as triisopropoxyaluminum and tetrabutoxyzirconium; and metal chelate compounds comprising Zr, Ti or Al or the like as a central metal. The inorganic acid is preferably hydrochloric acid or sulfuric acid. The organic acid is preferably one having an acid dissociation constant (pKa value (25° C.)) in water of not more than 4.5, more preferably one having an acid dissociation constant in hydrochloric acid, sulfuric acid or water of not more than 3.0, still more preferably one having an acid dissociation constant in hydrochloric acid, sulfuric acid or water of not more than 2.5, still more preferably one having an acid dissociation constant in water of not more than 2.5, still more preferably methanesulfonic acid, oxalic acid, phthalic acid, and malonic acid, particularly preferably oxalic acid. When metal corrosion prevention is taken into consideration, metal chelate compounds comprising Zr, Ti or Al or the like as a central metal are most preferred.

Preferably, the hydrolysis or condensation reaction of the organosilane may be carried out in the absence or presence of a solvent. The use of an organic solvent, however, is preferred from the viewpoint of homogeneously mixing the components. For example, alcohols, aromatic hydrocarbons, ethers, ketones, and esters are preferred.

The solvent can dissolve the organosilane and the catalyst. Further, the organic solvent is preferably used as a coating liquid or as a part of the coating liquid from the viewpoint of the process, and, when mixed with other material such as a fluoropolymer, does not sacrifice the solubility or dispersibility.

Water is added in an amount of 0.3 to 2 moles, preferably 0.5 to 1 mole, based on one mole of the hydrolyzable group in the organosilane, and the reaction is carried out by stirring at 25 to 100° C. in the presence or absence of the above solvent and in the presence of a catalyst.

The addition amount of the organosilane compound and/or the hydrolyzate and/or partial condensate of the organosilane compound added to the coating liquid for a low-refractive index layer is preferably 5 to 100% by mass, more preferably 5 to 50% by mass, particularly preferably 15 to 30% by mass, based on the fluoropolymer in the low-refractive index layer. When the addition amount is below the lower limit of the above-defined range, the effect of the present invention is less likely to be attained. On the other hand, when the addition amount is above the upper limit of the above-defined range, disadvantageously the refractive index is increased, or the shape or planar appearance of the surface of the film is deteriorated.

The addition amount of the organosilane compound and/or the hydrolyzate and/or partial condensate of the organosilane compound added to the hardcoat layer, anti-dazzling layer, and antistatic layer which are layers other than the low-refractive index layer is preferably 5 to 50% by mass, more preferably 10 to 40% by mass, particularly preferably 15 to 30% by mass, based on the mass of the solid matter of the resin binder for the cured film.

In the antireflection film according to the present invention, preferably, an inorganic filler is added to each layer provided on the transparent base material film. The inorganic fillers added to the respective layers may be the same or different. Preferably, the type and addition amount are properly regulated depending upon necessary properties such as refractive index, electrical conductivity, layer strength, layer thickness, and coatability.

For example, conventional silicone or fluoro antifouling agents and slip agents may be properly added to impart antifouling, water resistance, chemical resistance, slipperiness and other properties. When these additives are added, the addition amount is preferably in the range of 0.01 to 20% by mass, more preferably 0.05 to 10% by mass, particularly preferably 0.1 to 5% by mass, based on the total solid content of the low-refractive index layer.

6. Optional Components

In the anti-dazzling film (antireflection film) according to the present invention, preferably, an inorganic filler is added to each layer on a triacetylcellulose film. The inorganic fillers added to the respective layers may be the same or different, and the type and addition amount are preferably properly regulated depending upon necessary properties such as the refractive index, electrical conductivity, layer strength, layer thickness, and coatability.

For example, conventional silicone or fluoro antifouling agents and slip agents may be properly added to impart antifouling, water resistance, chemical resistance, slipperiness and other properties. When these additives are added, the addition amount is preferably in the range of 0.01 to 20% by mass, more preferably 0.05 to 10% by mass, particularly preferably 0.1 to 5% by mass, based on the total solid content of the low-refractive index layer.

Production of Anti-dazzling Film and Antireflection Film

The antireflection film according to the present invention may be produced by the following process. However, it should be noted that the antireflection film production process is not limited to the following process.

A coating liquid containing components for the formation of each layer is first prepared. Subsequently, the coating liquid is coated on a transparent base material film by dip coating, air-knife coating, curtain coating, roll coating, wire bar coating, gravure coating, or extrusion (see U.S. Pat. No. 2,681,294), and the coating is heated and dried. Microgravure coating, roll coating, and extrusion are particularly preferred from the viewpoint of coating accuracy. In order to improve the planarity of the base, it is also preferred to heat treat the film as a pre-step. Each coated layer is irradiated with light or heated to form a cured film. An antireflection film is finally formed through the above steps.

In another embodiment of the present invention, there is provided a production process of an anti-dazzling film comprising an anti-dazzling layer stacked on a triacetylcellulose film. The production process comprises coating, on the above triacetylcellulose film, a solvent-containing coating liquid comprising a light transparent resin comprising an acrylic resin, plastic light transparent fine particles, and a leveling agent comprising a copolymer comprising (meth)acrylic acid repeating units containing at least one perfluoroalkyl group having 8 or more carbon atoms and (meth)acrylic acid repeating units having at least one bornane ring, drying the coating, and curing the coating.

In a preferred embodiment of the present invention, the above solvent contains not less than 25% by mass and not more than 60% by mass, based on the total amount of the coating composition, of toluene.

Polarizing Plate

The polarizing plate is composed mainly of a polarizing film held between two protective films. The antireflection film according to the present invention is preferably used as at least one of the two protective films which hold the polarizing film therebetween. The production process of the polarizing plate can be reduced when the antireflection film according to the present invention functions also as the protective film. When the antireflection film according to the present invention is used as the outermost layer, a polarizing plate, which can prevent external light reflection and are also excellent in scratch resistance, antifouling properties and the like, can be provided.

The polarizing film may be a polarizing film which has been taken off from a conventional polarizing film or a continuous polarizing film of which the absorption axis is neither parallel nor perpendicular to the longitudinal direction. The continuous polarizing film of which the absorption axis is neither parallel nor perpendicular to the longitudinal direction is prepared by the method described in Japanese Patent Laid-Open No. 86554/2002. A stretching method for a polymer film is described in detail in paragraphs [0020] to [0030] of this publication.

In a preferred embodiment of the present invention, there is provided a polarizing plate comprising: a polarizing element; and an antireflection film according to the present invention stacked on a surface of the polarizing element so that the surface of the triacetylcellulose film remote from the anti-dazzling layer faces the polarizing element.

Image Display Device

When the antireflection film (anti-dazzling film) according to the present invention is used in an image liquid crystal display device, the antireflection film is disposed on the outermost surface of a display by providing a pressure-sensitive adhesive layer on one side of the antireflection film. When the transparent base material film is a birefringence-free cellulose acrylate film, for example, triacetylcellulose film is used as a protective film for protecting a polarizing layer in the polarizing plate. Therefore, preferably, the antireflection film according to the present invention as such is used in the protective film for low cost reasons.

When the antireflection film according to the present invention is used in such a form that a pressure-sensitive adhesive layer or the like is provided on one side of the antireflection film followed by the disposition of the assembly on the outermost surface of a display or the antireflection film as such is used as a protective film for a polarizing plate, after the formation of layers up to the low-refractive index layer on the transparent base material film is completed, preferably, saponification treatment is carried out for satisfactory adhesion purposes. The saponification treatment is carried out by a conventional method, for example, by a method in which the film is immersed in an alkaline liquid for a proper period of time. In order to prevent the alkaline component from staying in the film, preferably, after immersion in the alkaline liquid, the film is fully rinsed with water, or is immersed in a dilute acid to neutralize the alkaline component.

In a preferred embodiment of the present invention, there is provided an image display device comprising a light transparency display and a light source device for irradiating the light transparent display from its backside. This image display device comprises: the above light transparent display; and an anti-dazzling film according to the present invention, an antireflection film according to the present invention, or a polarizing plate according to the present invention stacked on a surface of the light transparent display.

Saponification Treatment

The saponification hydrophilizes the transparent base material film on its side remote from the low-refractive index layer.

The hydrolyzed surface is particularly effective in improving the adhesion between the transparent base material film and the polarizing film composed mainly of polyvinyl alcohol. Further, since dust present in the air is less likely to be adhered to the hydrolyzed surface, in bonding the antireflection film to the polarizing film, dust is less likely to enter between the polarizing film and the antireflection film and, thus, this is useful for the prevention of point defects by the dust.

The saponification is preferably carried out so that the contact angle of water on the surface of the transparent base material film remote from the outermost layer is 40° or less, more preferably 30° or less, particularly preferably 20° or less.

Specific means for alkali saponification treatment may be selected from the following two means (1) and (2). Means (1) is superior to means (2) in that the treatment is carried out in the same process as that in the case of the general-purpose triacetylcellulose film. Means (1), however, sometimes poses a problem that, since the saponification treatment progresses to the antireflection film face, the surface of the antireflection film is somewhat damaged and, in addition, the antireflection film is soiled by the residual saponification treatment liquid. In this case, the adoption of means (2) is preferred although means (2) is a special process.

(1) After the formation of an antireflection layer on a transparent support, the backside of the film is saponified by immersing the assembly in an alkaline liquid at least once.

(2) Before or after the formation of an antireflection layer on a transparent support, an alkaline liquid is coated onto the surface of the assembly remote from the antireflection film formation face, and the coating is heated, is rinsed with water and/or is neutralized to saponify only the backside of the antireflection film.

Second Aspect of the Present Invention

The anti-dazzling film and antireflection film according to the second aspect of the present invention will be described with reference to FIGS. 1 and 2. FIG. 1 and FIG. 2 are cross-sectional views showing a preferred embodiment of the antireflection film according to the first aspect of the present invention. The first aspect of the present invention and the second aspect of the present invention are identical to each other in layer construction as an anti-dazzling film (antireflection film).

An antireflection film 1 shown in FIG. 1 has a layer construction comprising a triacetylcellulose film 2 as a support, an anti-dazzling layer (anti-dazzling hardcat layer) 4, and a low-refractive index layer 5 stacked in that order. An antireflection film 10 shown in FIG. 2 comprises a triacetylcellulose film 2, an antistatic layer (electrically conductive hardcoat layer) 3, an anti-dazzling layer 4, and a low-refractive index layer 5 stacked in that order. The anti-dazzling layer 4 comprises a cured film formed by curing a resin composed mainly of an acrylic resin, i.e., a light transparent ionizing radiation curing-type polyfunctional resin. In the anti-dazzling layer 4, light transparent fine particles 12 for forming concaves and convexes are mainly contained in the surface of the anti-dazzling layer 4. Further, light transparent fine particles 13 which does not contribute to the formation of concaves and convexes on its surface may be contained. Two or more types of light transparent fine particles may be used. The low-refractive index layer 5 is coated as the outermost layer. The antistatic layer 3 is generally coated as a layer underlying the anti-dazzling layer 4. The position of the antistatic layer 3 is not limited to the position under the anti-dazzling layer 4 so far as the antistatic layer 3 is not provided as the outermost layer. The anti-dazzling layer 4 contains electrically conductive particles 14.

The refractive index of the cured film (binder matrix) in its part other than the light transparent fine particles 12 or 13 or electrically conductive particles (gold-nickel particles) 14 contained in the anti-dazzling layer 4 is preferably in the range of 1.50 to 2.00, and the refractive index of the low-refractive index layer 5 is preferably in the range of 1.30 to 1.50.

In the present specification, in the case where the numerical value represents a property value or amount, the description "(numerical value 1) to (numerical value 2)" refers to "not less than (numerical value 1) and not more than (numerical value 2)."

1. Anti-dazzling Layer

In order to impart hardcoat properties (that is, surface hardness) and to avoid an abnormal appearance (concave-convex face) caused by uneven curing shrinkage, the anti-dazzling layer (often referred to as "anti-dazzling hardcoat layer") comprises light transparent ionizing radiation curing-type polyfunctional resins at least one of which comprises a trifunctional acrylic resin. The anti-dazzling layer further comprises light transparent fine particles for imparting anti-dazzling properties, light transparent fine particles for imparting internal scattering properties, a leveling agent (a coating aid), and, if necessary, an inorganic filler for regulating the refractive index of the binder matrix and the like.

In the present invention, additive components other than the light transparent ionizing radiation curing-type polyfunctional resin at least one of which comprises a trifunctional acrylic resin, which will be described later, may be the same as those described above in connection with the first embodiment of the present invention. Specifically, the plastic light transparent fine particles, leveling agents, optional additives (inorganic fillers and organosilane compounds), and properties and formation of the anti-dazzling layer may be the same as those described above in connection with the first embodiment of the present invention.

Ionizing Radiation Curing-type Polyfunctional Resin

Examples of ionizing radiation curing-type polyfunctional acrylic resin include bifunctional acrylic resins such as tripropylene glycol di(meth)acrylate, polypropylene glycol di(meth)acrylate, diethylene glycol di(meth)acrylate, polyethylene glycol di(meth)acrylate, 1,3-butanediol di(meth)acrylate, 1,4-butanediol di(meth)acrylate, ethoxylated bisphenol A di(meth)acrylate, ethoxylated bisphenol F di(meth)acrylate, 1,6-hexanediol di(meth)acrylate, 1,9-nonanediol di(meth)acrylate, 1,10-decanediol di(meth)acrylate, glycerine di(meth)acrylate, neopentyl glycol di(meth)acrylate, propoxylated neopentyl glycol di(meth)acrylate, pentaerythritol diacrylate monostearate, isocyanuric acid ethoxy-modified di(meth)acrylate (isocyanuric acid EO modified di(meth)acrylate), bifunctional urethane acrylate, and bifunctional polyester acrylate; trifunctional acrylic resins such as pentaerythritol tri(meth)acrylate, trimetylolpropane tri(meth)acrylate, trimethylolpropane EO modified tri (meth)acrylate, isocyanuric acid EO modified tri(meth)acrylate, ethoxylated trimetylolpropane tri(meth)acrylate, propoxylated trimetylolpropane tri(meth)acrylate, propoxylated glyceryl tri(meth)acrylate, and trifunctional polyester acrylate; tetrafunctional acrylic resins such as pentaerythritol tetra(meth)acrylate, ditrimetylolpropane tetra(meth)acrylate, and ethoxylated pentaerythritol tetra(meth)acrylate; and penta- or higher acrylic resins such as dipentaerythritol hydroxy penta(meth)acrylate and dipentaerythritol hexaacrylate. In the above compounds, (meth)actylate refers to acrylate and/or methacrylate.

In at least one trifunctional acrylic resin contained in the anti-dazzling layer according to the present invention, preferably, at least one trifunctional acrylic resin is pentarythritol triacrylate. The content of the trifunctional acrylic resin is preferably not less than 55% by mass based on the total mass of the ionizing radiation curing-type polyfunctional resin. When the content of the trifunctional acrylic resin is less than 55% by mass, it is difficult to simultangeously realize surface hardness and planar appearance.

Further, in addition to the trifunctional acrylic resin, at least one difunctional acrylic resin is further contained as the ionizing radiation curing-type polyfunctional resin for constituting the anti-dazzling layer according to the present invention. In particular, the difunctional acrylic resin is preferably a diacrylate having an isocyanuric acid skeleton. Specifically, for example, isocyanuric acid EO modified diacrylate (manufactured by TOAGOSEI Co., Ltd.) is preferred. The content of the difunctional acrylic resin is preferably not less than 10% by mass and not more than 45% by mass based on the total mass of the ionizing radiation curing-type polyfunctional resin. When the content of the difunctional acrylic resin is less than 10% by mass, the level of the effect of further reducing uneven curing shrinkage is very small. On the other hand, when the content of the difunctional acrylic resin exceeds 45% by mass, the surface hardness is disadvantageously lowered.

The addition amount of the ionizing radiation curing-type polyfunctional resin composition in the anti-dazzling layer is preferably not less than 15% by mass and not more than 85% by mass based on the total mass of the solid matter of the anti-dazzling layer.

When the ionizing radiation curing-type polyfunctional resin is used as the ultraviolet (UV) curing resin, a photopolymerization initiator may be mixed in the ionizing radiation curing-type polyfunctional resin. Examples of photopolymerization initiators include acetophenones, benzophenones, Michler's benzoyl benzoate, α-amyloxime esters, and thioxanthones. Further, a photosensitizer may be mixed in the ionizing radiation. Examples of photosensitizers include n-butylamine, triethylamine, and tri-n-butylphosphine.

Various examples, which are useful in the present invention, are also described in Saishin UV Koka Gijutsu (Advanced UV Curing Technique) (p. 159, publisher; Kazuhiro Takausu, publishing office: TECHNICAL INFORMATION INSTITUTE CO., LTD., published in 1991).

Preferred commercially available photopolymerization initiators include Irgacure 651 (tradename), Irgacure 184 (tradename), and Irgacure 907 (tradename) manufactured by Ciba Specialty Chemicals, K.K.

The amount of the photopolymerization initiator used is preferably in the range of 1 to 10 parts by mass, particularly preferably 3 to 8 parts by mass, based on 100 parts by mass of the ionizing radiation curing-type polyfunctional resin.

The light transparent resin for the formation of the anti-dazzling layer may be an acrylic resin as the above ionizing radiation curing-type polyfunctional resin containing a solvent drying-type resin. For example, thermoplastic resins, such as senol resins, urea resins, diallyl phthalate resins, melamine resins, guanamine resins, unsaturated polyester resins, polyurethane resins, epoxy resins, aminoalkyd resins, melamine-urea co-condensed resins, silicone resins, and polysiloxane resins may be used as the solvent drying-type resin.

The solvent drying-type thermoplastic resin added to the ionizing radiation curing-type resin may be of a conventional type. In particular, when a cellulose acylate film such as a triacetylcellulose (TAC) film is used as the transparent base material film, cellulosic resins, for example, nitrocellulose, acetylcellulose, cellulose acetate propionate, and ethylhydroxyethylcellulose are advantageous as the solvent drying-type resin contained in the ionizing radiation curing-type resin from the viewpoints of adhesion of the coating film and transparency.

The ionizing radiation curing-type resin composition can be cured by a conventional method for curing the ionizing radiation curing-type resin composition, that is, by irradiation with an electron beam or ultraviolet light.

For example, in the case of electron beam curing, electron beams having an energy of 50 to 1000 KeV, preferably 100 to 300 KeV, emitted from various electron beam accelerators, for example, Cockcroft-Walton, van de Graaff, resonance transformer, insulated core transformer, linear, dynamitron, and high-frequency electron beam accelerators may be used. On the other hand, in the case of ultraviolet curing, for example, ultraviolet light emitted from light sources such as ultrahigh pressure mercury lamps, high pressure mercury lamps, low pressure mercury lamps, carbon arc, xenon arc, and metal halide lamps, may be utilized.

2. In the anti-dazzling film and anireflection film in the second aspect of the present invention, the construction may be the same as that in the first aspect of the present invention except for 1. component of the anti-dazzling layer. Therefore, 2. low-refractive index layer, 3. triacetylcellulose film, 4. antistatic layer, 5. organosilane compound, 6. optional components, the production of the anti-dazzling film and antireflection film, the polarizing plate, the image display device, saponification treatment and the like may be the same as those described above in connection with the first aspect of the present invention.

EXAMPLES

The following Examples further illustrate the present invention. However, it should be noted that the present invention is not limited to these Examples only. "Parts" and "%" are by mass unless otherwise specified.

First Aspect of the Present Invention (Preparation of Partial Condensate (I) of Hydrolyzate of Organosilane Compound)

Methyl ethyl ketone (120 parts), 100 parts of acryloxypropyltrimethoxysilane (KBM-5103: tradename, manufactured by The Shin-Etsu Chemical Co., Ltd.), and 3 parts of diisopropoxy aluminum ethylacetoacetate were placed in and mixed with each other in a reactor provided with a stirrer and a reflux condenser. Ion exchanged water (30 parts) was added, and a reaction was allowed to proceed at 60° C. for 4 hr. The reaction mixture was cooled to room temperature to give a partial condensate (I) of a hydrolyzate of an organosilane compound. The mass average molecular weight was 1600, and 100% of the oligomer or higher molecular weight components was components having a molecular weight of 1000 to 20000. Gas chromatography analysis showed that acryloxypropyltrimethoxysilane as the starting material was not present at all.

(Preparation of Partial Condensate (II) of Hydrolyzate of Organosilane Compound)

Methyl ethyl ketone (120 parts), 100 parts of 3-methacryloxypropyltrimethoxysilane (KBM-503: tradename, manufactured by The Shin-Etsu Chemical Co., Ltd.), and 3 parts of diisopropoxy aluminum ethylacetoacetate were placed in and mixed with each other in a reactor provided with a stirrer and a reflux condenser. Ion exchanged water (30 parts) was added, and a reaction was allowed to proceed at 60° C. for 4 hr. The reaction mixture was cooled to room temperature to give a partial condensate (II) of a hydrolyzate of an organosilane compound. The mass average molecular weight was 1600, and 100% of the oligomer or higher molecular weight components was components having a molecular weight of 1000 to 20000. Gas chromatography analysis showed that 3-methacryloxypropyltrimethoxysilane as the starting material was not present at all.

(Preparation of Coating Liquid 1 for Anti-dazzling Layer)

Pentaerythritol triacrylate (tradename (PET-30): manufactured by Nippon Kayaku Co., Ltd., refractive index 1.51) (26.64 parts by mass) as an ultraviolet curing resin, 1.44 parts by weight of a mixture of dipentaerythritol pentaacrylate and dipentaerythritol hexaacrylate (DPHA) (manufactured by Nippon Kayaku Co., Ltd., refractive index 1.51) as ultraviolet curing resins, 2.88 parts by mass of an acrylic polymer (manufactured by Mitsubishi Rayon Co., Ltd., molecular weight 75,000), 1.37 parts by mass of Irgacure 184 (tradename, manufactured by Ciba Specialty Chemicals, K.K.) as a photocuring initiator, 1.49 parts by mass of acryl-styrene beads (manufactured by Soken Chemical Engineering Co., Ltd., particle diameter 3.5 μm, refractive index 1.55) as first light transparent fine particles, 4.64 parts by mass of styrene beads (manufactured by Soken Chemical Engineering Co., Ltd., particle diameter 3.5 μm, refractive index 1.60) as second light transparent fine particles, 0.046 part by mass of a leveling agent R-30 (tradename, manufactured by Dainippon Ink and Chemicals, Inc.), 6.19 parts by mass of KBM-5103 (tradename, manufactured by The Shin-Etsu Chemical Co., Ltd.) as an organosilane compound, 38.71 parts by mass of toluene, and 16.59 parts by mass of cyclohexanone were thoroughly mixed together to prepare a coating liquid. The coating liquid was filtered through a polypropylene filter having a pore diameter of 30 μm to prepare a coating liquid 1 for an anti-dazzling layer.

(Preparation of Coating Liquids 2 to 10 for Anti-dazzling Layer)

Coating liquids 2 to 10 for an anti-dazzling layer (coating liquids for an anti-dazzling layer of Examples 2 to 5, Comparative Example 1, and Examples 6 to 9) were prepared in the same manner as in coating liquid 1 for an anti-dazzling layer, except that the amount of the leveling agent used was varied as shown in Table 4 below.

(Preparation of Coating Liquids 11 to 18 for Anti-dazzling Layer)

Coating liquids 11 to 18 for an anti-dazzling layer (coating liquids for an anti-dazzling layer of Comparative Examples 2 to 7 and Examples 10 and 11) were prepared in the same manner as in coating liquid 1 for an anti-dazzling layer, except that the type of the leveling agent was varied as shown in Table 4 below.

TABLE 4

| Name of sample | Coating liquid for anti-dazzling layer | Leveling agent | Amount used (based on binder) | Organosilane compound | Amount used (based on binder) |
|---|---|---|---|---|---|
| Ex. 1 | Coating liquid for anti-dazzling layer 1 | R-30 (fluorocompound: Dainippon Ink and Chemicals, Inc.) | 0.15 wt. % | KBM-5103(3-acryloxypropyl-trimethoxy-silane: The Shin-Etsu Chemical Co., Ltd.) | 20 wt. % |
| Ex. 2 | Coating liquid for anti-dazzling layer 2 | ↑ | 0.10 wt. % | ↑ | ↑ |
| Ex. 3 | Coating liquid for anti-dazzling layer 3 | ↑ | 0.08 wt. % | ↑ | ↑ |
| Ex. 4 | Coating liquid for anti-dazzling layer 4 | ↑ | 0.05 wt. % | ↑ | ↑ |
| Ex. 5 | Coating liquid for anti-dazzling layer 5 | ↑ | 0.04 wt. % | ↑ | ↑ |
| Comp. Ex. 1 | Coating liquid for anti-dazzling layer 6 | ↑ | None | ↑ | ↑ |
| Ex. 6 | Coating liquid for anti-dazzling layer 7 | ↑ | 0.20 wt. % | ↑ | ↑ |
| Ex. 7 | Coating liquid for anti-dazzling layer 8 | ↑ | 0.25 wt. % | ↑ | ↑ |
| Ex. 8 | Coating liquid for anti-dazzling layer 9 | ↑ | 0.50 wt. % | ↑ | ↑ |
| Ex. 9 | Coating liquid for anti-dazzling layer 10 | ↑ | 0.60 wt. % | ↑ | ↑ |
| Comp. Ex. 2 | Coating liquid for anti-dazzling layer 11 | FC431 (fluorocompound: Sumitomo 3M Ltd. | 0.15 wt. % | ↑ | ↑ |
| Comp. Ex. 3 | Coating liquid for anti-dazzling layer 12 | KF56 (silicone compound: The Shin-Etsu Chemical Co., Ltd.) | ↑ | ↑ | ↑ |
| Comp. Ex. 4 | Coating liquid for anti-dazzling layer 13 | SH-3748 (silicone compound: Dow Corning Toray Silicone Company, Ltd.) | ↑ | ↑ | ↑ |
| Comp. Ex. 5 | Coating liquid for anti-dazzling layer 14 | F-171 (fluorocompound: Dainippon Ink and Chemicals, Inc.) | ↑ | ↑ | ↑ |
| Comp. Ex. 6 | Coating liquid for anti-dazzling layer 15 | F-470 (fluorocompound: Dainippon Ink and Chemicals, Inc.) | ↑ | ↑ | ↑ |
| Comp. Ex. 7 | Coating liquid for anti-dazzling layer 16 | F-473 (fluorocompound: Dainippon Ink and Chemicals, Inc.) | ↑ | ↑ | ↑ |
| Ex. 10 | Coating liquid for anti-dazzling layer 17 | Compound P-3 described in the specification | ↑ | ↑ | ↑ |
| Ex. 11 | Coating liquid for anti-dazzling layer 18 | Compound P14 described in the specification | ↑ | ↑ | ↑ |

| Name of sample | Solvent composition (proportion of toluene based on total amount of coating composition) | Coating liquid for low refractive index layer | Organosilane compound | Effect; planar appearance | Steel wool scratch resistance test | Integral reflectance, % |
|---|---|---|---|---|---|---|
| Ex. 1 | Toluene/cyclohexanone = 70/30 wt. % (38 wt. %) | Coating liquid A for low refractive index layer | None | 5 | 5 | 2.7 |
| Ex. 2 | ↑ | ↑ | ↑ | 5 | 5 | 2.7 |
| Ex. 3 | ↑ | ↑ | ↑ | 5 | 5 | 2.7 |
| Ex. 4 | ↑ | ↑ | ↑ | 4 | 5 | 2.7 |
| Ex. 5 | ↑ | ↑ | ↑ | 3 | 5 | 2.7 |
| Comp. Ex. 1 | ↑ | ↑ | ↑ | 0 | 5 | 2.7 |
| Ex. 6 | ↑ | ↑ | ↑ | 5 | 5 | 2.7 |
| Ex. 7 | ↑ | ↑ | ↑ | 5 | 4 | 2.8 |
| Ex. 8 | ↑ | ↑ | ↑ | 5 | 4 | 2.8 |
| Ex. 9 | ↑ | ↑ | ↑ | 5 | 3 | 2.9 |
| Comp. Ex. 2 | ↑ | ↑ | ↑ | 3 | 1 | 3.3 |
| Comp. Ex. 3 | ↑ | ↑ | ↑ | 3.5 | 0 | 3.7 |
| Comp. Ex. 4 | ↑ | ↑ | ↑ | 3.5 | 0 | 3.6 |

TABLE 4-continued

| | | | | | | |
|---|---|---|---|---|---|---|
| Comp. Ex. 5 | ↑ | ↑ | ↑ | 3 | 1 | 3.3 |
| Comp. Ex. 6 | ↑ | ↑ | ↑ | 3 | 1 | 3.3 |
| Comp. Ex. 7 | ↑ | ↑ | ↑ | 3 | 1 | 3.3 |
| Ex. 10 | ↑ | ↑ | ↑ | 5 | 5 | 2.7 |
| Ex. 11 | ↑ | ↑ | ↑ | 4 | 4 | 2.8 |

(Preparation of Coating Liquids 19 to 23 for Anti-dazzling Layer)

Coating liquids 19 to 23 for an anti-dazzling layer (coating liquids for an anti-dazzling layer of Examples 12 to 16) were prepared in the same manner as in coating liquid 1 for an anti-dazzling layer, except that the type of the organosilane compound was varied as shown in Table 5.

(Preparation of Coating Liquids 24 to 30 for Anti-dazzling Layer)

Coating liquids 24 to 30 for an anti-dazzling layer (coating liquids for an anti-dazzling layer of Examples 17 to 23) were prepared in the same manner as in coating liquid 1 for an anti-dazzling layer, except that the amount of KBM-5103 used was varied as shown in Table 5.

(Preparation of Coating Liquids 31 to 35 for Anti-dazzling Layer)

Coating liquids 31 to 35 for an anti-dazzling hardcoat (coating liquids for an anti-dazzling layer of Examples 24 to 28) were prepared in the same manner as in coating liquid 1 for an anti-dazzling layer, except that the solvent composition was varied as shown in Table 5.

TABLE 5

| Name of sample | Coating liquid for anti-dazzling layer | Leveling agent | Amount used (based on binder) | Organosilane compound | Amount used (based on binder) | Solvent composition (proportion of toluene based on total amount of coating composition) |
|---|---|---|---|---|---|---|
| Ex. 12 | Coating liquid for anti-dazzling layer 19 | R-30 (fluorocompound: Dainippon Ink and Chemicals, Inc.) | 0.15 wt. % | KBM-903(3-aminopropyl-trimethoxy-silane) | 20 wt. % | Toluene/cyclohexanone = 70/30 wt. % (38 wt. %) |
| Ex. 13 | Coating liquid for anti-dazzling layer 20 | ↑ | ↑ | KBE-9007(3-isocyanate-propyltri-ethoxysilane) | 20 wt. % | ↑ |
| Ex. 14 | Coating liquid for anti-dazzling layer 21 | ↑ | ↑ | KBM-403(3-glycidoxytri-methoxysilane) | 20 wt. % | ↑ |
| Ex. 15 | Coating liquid for anti-dazzling layer 22 | ↑ | ↑ | KBM-503(3-methacryloxy-trimethoxy-silane) | 20 wt. % | ↑ |
| Ex. 16 | Coating liquid for anti-dazzling layer 23 | ↑ | ↑ | Partial condensate (I) of hydrolysate of organosilane compound described in specification | 20 wt. % | ↑ |
| Ex. 17 | Coating liquid for anti-dazzling layer 24 | ↑ | ↑ | None | — | ↑ |
| Ex. 18 | Coating liquid for anti-dazzling layer 25 | ↑ | ↑ | KBM-5103(3-acryloxypropyl-trimethoxy-silane: The Shin-Etsu Chemical Co., Ltd.) | 5 wt. % | ↑ |
| Ex. 19 | Coating liquid for anti-dazzling layer 26 | ↑ | ↑ | ↑ | 10 wt. % | ↑ |
| Ex. 20 | Coating liquid for anti-dazzling layer 27 | ↑ | ↑ | ↑ | 15 wt. % | ↑ |
| Ex. 21 | Coating liquid for anti-dazzling layer 28 | ↑ | ↑ | ↑ | 30 wt. % | ↑ |
| Ex. 22 | Coating liquid for anti-dazzling layer 29 | ↑ | ↑ | ↑ | 40 wt. % | ↑ |
| Ex. 23 | Coating liquid for anti-dazzling layer 30 | ↑ | ↑ | ↑ | 50 wt. % | ↑ |
| Ex. 24 | Coating liquid for anti-dazzling layer 31 | R-30 (fluorocompound: Dainippon Ink and Chemicals, Inc.) | ↑ | ↑ | 20 wt. % | Toluene/cyclohexanone = 50/50 wt. % (27 wt. %) |

TABLE 5-continued

| | | | | | | | |
|---|---|---|---|---|---|---|---|
| Ex. 25 | Coating liquid for anti-dazzling layer 32 | ↑ | ↑ | ↑ | | ↑ | Toluene/cyclohexanone = 40/60 wt. % (21 wt. %) |
| Ex. 26 | Coating liquid for anti-dazzling layer 33 | ↑ | ↑ | ↑ | | ↑ | Toluene/cyclohexanone = 90/10 wt. % (49 wt. %) |
| Ex. 27 | Coating liquid for anti-dazzling layer 34 | ↑ | ↑ | ↑ | | ↑ | Methyl ethyl ketone/cyclohexanone = 70/30 wt. % (38 wt. %) |
| Ex. 28 | Coating liquid for anti-dazzling layer 35 | ↑ | ↑ | ↑ | | ↑ | Ethyl acetate/cyclohexanone = 70/60 wt. % (38 wt. %) |

| Name of sample | Coating liquid for low refractive index layer | Organosilane compound | Effect; planar appearance | Steel wool scratch resistance test | Integral reflectance, % |
|---|---|---|---|---|---|
| Ex. 12 | Coating liquid A for low refractive Index layer | None | 5 | 4 | 2.7 |
| Ex. 13 | ↑ | ↑ | 5 | 4 | 2.7 |
| Ex. 14 | ↑ | ↑ | 5 | 5 | 2.7 |
| Ex. 15 | ↑ | ↑ | 5 | 5 | 2.7 |
| Ex. 16 | ↑ | ↑ | 5 | 5.5 | 2.7 |
| Ex. 17 | ↑ | ↑ | 5 | 3 | 2.7 |
| Ex. 18 | ↑ | ↑ | 5 | 4 | 2.7 |
| Ex. 19 | ↑ | ↑ | 5 | 4.5 | 2.7 |
| Ex. 20 | ↑ | ↑ | 5 | 5 | 2.7 |
| Ex. 21 | ↑ | ↑ | 5 | 5 | 2.7 |
| Ex. 22 | ↑ | ↑ | 4.5 | 5 | 2.7 |
| Ex. 23 | ↑ | ↑ | 4 | 5 | 2.7 |
| Ex. 24 | Coating liquid A for low refractive index layer | None | 5 | 5 | 2.7 |
| Ex. 25 | ↑ | ↑ | 4 | 5 | 2.7 |
| Ex. 26 | ↑ | ↑ | 5 | 5 | 2.7 |
| Ex. 27 | ↑ | ↑ | 3.5 | 5 | 2.7 |
| Ex. 28 | ↑ | ↑ | 3.5 | 5 | 2.7 |

(Preparation of Coating Liquids 36 to 39 for Anti-dazzling Layer)

Coating liquids 36 to 39 for an anti-dazzling layer (coating liquids for an anti-dazzling layer of Examples 32 to 35) were prepared in the same manner as in coating liquid 1 for an anti-dazzling layer, except that the type of the leveling agent was varied as shown in Table 6 below.

(Preparation of Coating Liquid 40 for Anti-dazzling Layer)

Bright GNR 4.6-EH (tradename, gold-nickel coated resin beads, manufactured by The Nippon Chemical Industrial Co., Ltd., average particle diameter 4.5 μm, spherical) as electrically conductive particles were added (amount: 0.1% of total amount of anti-dazzling layer) to coating liquid 1 for an anti-dazzling layer to prepare coating liquid 40 for an anti-dazzling layer (a coating liquid for an anti-dazzling layer of Example 37).

TABLE 6

| Name of sample | Coating liquid for anti-dazzling layer | Leveling agent | Amount used (based on binder) | Organosilane compound | Amount used (based on binder) | Solvent composition (proportion of toluene based on total amount of coating composition) |
|---|---|---|---|---|---|---|
| Ex. 29 | Coating liquid 1 for anti-dazzling layer | R-30 (fluorocompound: Dainippon Ink and Chemicals, Inc.) | 0.15 wt. % | KBM-5103(3-acryloxypropyl-trimethoxy-silane: The Shin-Etsu Chemical Co., Ltd.) | 20 wt. % | Toluene/cyclohexanone = 70/30 wt. % (38 wt. %) |
| Ex. 30 | ↑ | ↑ | ↑ | ↑ | ↑ | ↑ |
| Ex. 31 | ↑ | ↑ | ↑ | ↑ | ↑ | ↑ |
| Ex. 32 | Coating liquid 36 for anti-dazzling layer | Compound P1 described in the specification (Mw = 2500) | ↑ | ↑ | ↑ | ↑ |
| Ex. 33 | Coating liquid 37 for anti-dazzling layer | Compound P4 described in the specification | ↑ | ↑ | ↑ | ↑ |

TABLE 6-continued

| | | | | | | |
|---|---|---|---|---|---|---|
| Ex. 34 | Coating liquid 38 for anti-dazzling layer | Compound P9 described in the specification | ↑ | ↑ | ↑ | ↑ |
| Ex. 35 | Coating liquid 39 for anti-dazzling layer | Compound P6 described in the specification | ↑ | ↑ | ↑ | ↑ |
| Ex. 36 | ↑ | ↑ | ↑ | ↑ | ↑ | ↑ |
| Ex. 37 (AS layer additionally provided to construction of Ex. 29) | Coating liquid 40 for anti-dazzling layer | R-30 (fluorocompound: Dainippon Ink and Chemicals, Inc.) | ↑ | ↑ | ↑ | ↑ |

| | Name of sample | Coating liquid for low refractive index layer | Organosilane compound | Effect; planar appearance | Steel wool scratch resistance test | Integral reflectance, % |
|---|---|---|---|---|---|---|
| | Ex. 29 | Coating liquid B for low refractive index layer | Partial condensate (I) of hydrolyzate of organosilane compound described in the specification | 5 | 7 | 2.7 |
| | Ex. 30 | Coating liquid D for low refractive index layer | Partial condensate (II) of hydrolyzate of organosilane compound described in the specification | 5 | 7 | 2.7 |
| | Ex. 31 | Coating liquid E for low refractive index layer | KBM-5103 (3-acryloxy-propyltri-methoxysilane: The Shin-Etsu Chemical Co., Ltd.) | 5 | 6 | 2.7 |
| | Ex. 32 | Coating liquid B for low refractive index layer | Partial condensate (I) of hydrolyzate of organosilane compound described in the specification | 5 | 7 | 2.7 |
| | Ex. 33 | ↑ | ↑ | 5 | 7 | 2.7 |
| | Ex. 34 | ↑ | ↑ | 4 | 7 | 2.7 |
| | Ex. 35 | ↑ | ↑ | 4 | 7 | 2.9 |
| | Ex. 36 | Coating liquid C for low refractive index layer (different in fluoropolymer) | Partial condensate (I) of hydrolyzate of organosilane compound described in the specification | 5 | 7 | 2.5 |
| | Ex. 37 (AS layer additionally provided to construction of Ex. 29) | Coating liquid B for low refractive index layer | Partial condensate (I) of hydrolyzate of organosilane compound described in the specification | 5 | 7 | 2.7 |

(Preparation of Coating Liquid A for Low-refractive Index Layer)

A heat crosslinking fluoropolymer having a refractive index of 1.44 (solid content 6%, MEK solution) (13 g), 1.3 g of a colloidal silica dispersion liquid MEK-ST-L (tradename, average particle diameter 45 nm, solid content 30%, manufactured by Nissan Chemical Industries Ltd.), 5.6 g of methyl ethyl ketone, and 0.6 g of cyclohexanone were added and stirred, and the mixture was then filtered through a polypropylene filter having a pore diameter of 1 μm to prepare coating liquid A for a low-refractive index layer.

(Preparation of Coating Liquid B for Low-refractive Index Layer)

A heat crosslinking fluoropolymer having a refractive index of 1.44 (solid content 6%, MEK solution) (13 g), 1.3 g of a colloidal silica dispersion liquid MEK-ST-L (tradename, average particle diameter 45 nm, solid content 30%, manufactured by Nissan Chemical Industries Ltd.), 0.6 g of the partial condensate (I) liquid of hydrolyzate of the organosilane compound, 5 g of methyl ethyl ketone, and 0.6 g of cyclohexanone were added and stirred, and the mixture was then filtered through a polypropylene filter having a pore diameter of 1 μm to prepare coating liquid B for a low-refractive index layer (coating liquid for a low-refractive index layer of Examples 29 to 35 and Example 37).

(Preparation of Coating Liquid C for Low-refractive Index Layer)

A heat crosslinking fluoropolymer having a refractive index of 1.42 JN7228A (tradename, solid content 6%, MEK solution, manufactured by JSR Corporation) (13 g), 1.3 g of a colloidal silica dispersion liquid MEK-ST-L (tradename, average particle diameter 45 nm, solid content 30%, manufactured by Nissan Chemical Industries Ltd.), 0.6 g of the partial condensate (I) liquid of hydrolyzate of the organosilane compound, 5 g of methyl ethyl ketone, and 0.6 g of cyclohexanone were added and stirred, and the mixture was then filtered through a polypropylene filter having a pore diameter of 1 μm to prepare coating liquid C for a low-refractive index layer (coating liquid for a low-refractive index layer of Example 36).

(Preparation of Coating Liquid D for Low-refractive Index Layer)

A heat crosslinking fluoropolymer having a refractive index of 1.44 (solid content 6%, MEK solution) (13 g), 1.3 g of a colloidal silica dispersion liquid (average particle diameter 45 nm, solid content 30%, manufactured by Nissan Chemical Industries Ltd.), 0.6 g of the partial condensate (II) liquid of hydrolyzate of the organosilane compound, 5 g of methyl ethyl ketone, and 0.6 g of cyclohexanone were added and stirred, and the mixture was then filtered through a polypropylene filter having a pore diameter of 1 μm to prepare coating liquid D for a low-refractive index layer.

(Preparation of Coating Liquid E for Low-refractive Index Layer)

A heat crosslinking fluoropolymer having a refractive index of 1.44 (solid content 6%, MEK solution) (13 g), 1.3 9 of a colloidal silica dispersion liquid (average particle diameter 45 nm, solid content 30%, manufactured by Nissan Chemical Industries Ltd.), 0.6 g of 3-acryloxypropyltrimethoxysilane (KBM-5103, manufactured by The Shin-Etsu Chemical Co., Ltd.), 5 g of methyl ethyl ketone, and 0.6 g of cyclohexanone were added and stirred, and the mixture was then filtered through a polypropylene filter having a pore diameter of 1 μm to prepare coating liquid E for a low-refractive index layer.

(Preparation of Coating Liquid for Antistatic Layer)

Regarding the material for an antistatic layer, 2.0 g of C-4456S-7 (tradename, ATO-containing electrically conductive ink, average particle diameter of ATO 300 to 400 nm, solid content 45%, manufactured by NIPPON PELNOX CORP.), 2.84 g of methyl isobutyl ketone, and 1.22 g of cyclohexanone were added and stirred, and the mixture was then filtered through a polypropylene filter having a pore diameter of 30 μm to prepare coating liquid I for an antistatic layer.

Example 1

(1) Coating of Anti-dazzling Layer

An 80 μm-thick triacetylcellulose film (TD80U: tradename, manufactured by Fuji Photo Film Co., Ltd.) was wound off in a roll form, and coating liquid 1 for an anti-dazzling layer prepared in the above step was coated to a coating a thickness of 7 μm on a dry basis, and the coating was dried at 110° C. for one min to remove the solvent. The coating was then photocured under nitrogen purge (oxygen concentration: not more than 200 ppm) by irradiation with ultraviolet light at 55 mJ to form an anti-dazzling layer which was then wound.

(2) Coating of Low-refractive Index Layer

The triacetylcellulose film coated with the anti-dazzling layer was again wound off and was coated with coating liquid A for a low-refractive index layer to a thickness of 100 nm on a dry basis. The coating was dried at 120° C. for 70 sec, was further dried at 110° C. for 10 min, was heat cured, was irradiated with ultraviolet light at 120 mJ under nitrogen purge (oxygen concentration: not more than 100 ppm) for photocuring to form an antireflection film coated with a low-refractive index layer which was then wound.

(3) Saponification of Antireflection Film

After the antireflection film formation, the following treatment was carried out. A 1.5 mol/L aqueous sodium hydroxide solution was prepared and was kept at 55° C. A 0.005 mol/L aqueous dilute sulfuric acid solution was prepared and was kept at 35° C. The antireflection film was immersed in the aqueous sodium hydroxide solution for 2 min. Thereafter, the antireflection film was then immersed in water to thoroughly wash away the aqueous sodium hydroxide solution. Next, the antireflection film was immersed in the above aqueous dilute sulfuric acid solution for one min and was then immersed in water to thoroughly wash away the aqueous dilute sulfuric acid solution. Finally, the antireflection film was thoroughly dried at 120° C.

Thus, a saponified antireflection film of Example 1 was prepared as sample 1.

(Evaluation of Antireflection Film)

The films thus obtained were evaluated for the following items. The results are shown in Table 4 above.

(1) Evaluation of Planar Appearance

The antireflection film was evaluated in detail by 1) a transmission planar test under a three-wavelength fluorescent lamp and 2) a reflection planar test in which an oil-based black ink is coated on the opposite side of an antireflection film face, and the assembly is subjected to the test under a three-wavelength fluorescent lamp for planar uniformity (for freedom from uneven fluidity, uneven drying, coating streaks and unevenness and the like).

0: Poor planar appearance
1 to 2: Goal unattainment
3: Acceptable
4 to 5: Considerably good to very good (2) Average Integral Reflectance The antireflection film was laminated onto a crossed Nicol polarizing plate, and the spectral reflectance at an incident angle of 5 degrees was measured in a wavelength range of 380 to 780 nm with a spectrophotometer (manufactured by Japan Spectroscopic Co., Ltd.). The integrating sphere average reflectance at 450 to 650 nm was used as the result. The integral reflection varies depending upon the refractive index of the low-refractive index layer. For identical low-refractive index layer formulation, when the affinity for the underlying anti-dazzling layer is poor, the layer thickness becomes microscopically uneven and, consequently, the integral reflectance is increased.

(3) Evaluation of Steel Wool Scratch Resistance

A rubbing test was carried out with a rubbing tester under the following conditions.

Evaluation environment conditions: 25° C., 60% RH. Rubbing material: A steel wool (manufactured by Japan Steel Wool Corp. Grade No. 0000) was wound around the tester in its rubbing front end (1 cm×1 cm) which comes into contact with a sample and was banded to render the steel wool immovable.

Travel distance (one way): 13 cm
Rubbing speed: 13 cm/sec
Load: 500 g/cm$^2$
Front end contact area: 1 cm×1 cm
Number of times of rubbing: Reciprocation by 10 times An oil-based black ink was coated onto the backside of the rubbed sample, and the assembly was visually inspected by taking advantage of reflected light for scratches in the rubbed part. The results were evaluated by the following seven numerical grades.
0: Low scratch resistance
1 to 2: Goal unattainment
3: Acceptable
4 to 5: Good
6 to 7: Considerably good to very good Examples 2 to 36

Example samples 2 to 36 and Comparative Example samples 1 to 7 were prepared in quite the same manner as in Example sample 1, except that the coating liquid for an anti-dazzling layer and the coating liquid for a low-refractive index layer were varied as described in Tables 4 to 6.

Example 37

An antistatic layer (AS layer) was coated onto a triacetylcellulose film under the following conditions. Coating liquid 40 for an anti-dazzling layer was coated onto the antistatic layer in the same manner as in the sample of Example 29, and coating liquid B for a low-refractive index layer was coated onto the anti-dazzling layer in the same manner as in the sample of Example 29.

(Preparation of Antireflection Film with Antistatic Layer)

A coating liquid for an antistatic layer was coated onto a triacetylcellulose film to a thickness of 1.2 μm. The coating was dried at 70° C. for one min and was then irradiated with UV light (ultraviolet light) at 54 mJ under nitrogen purge for half-curing. Next, coating liquid 40 for an anti-dazzling layer was coated onto the antistatic layer to a thickness of 7 μm. The coating was dried at 110° C. for 20 sec and at 50° C. for 20 sec, and the coating was exposed to UV light at 55 mJ under nitrogen purge for half-curing. The composition of coating liquid 40 for an anti-dazzling layer was the same as in coating liquid 1 for an anti-dazzling layer, except that 0.1%, based on the total amount of the anti-dazzling layer, of Bright GNR 4.6-EH (tradename, gold-nickel coated resin beads: manufactured by The Nippon Chemical Industrial Co., Ltd.) as electrically conductive particles was added to coating liquid 1 for an anti-dazzling layer. Further, a low-refractive index layer was formed on the anti-dazzling layer in the same manner as in the coating of the low-refractive index layer, except that coating liquid B for a low-refractive index layer was used.

Summary of Results of Examples and Comparative Examples

The results shown in Tables 4 to 6 will be summarized below.

1) The leveling agent of each Example was much superior to the leveling agent of each Comparative Example in the planar appearance and various properties (scratch resistance and integral reflectance). Good planar appearance and various properties (scratch resistance and integral reflectance) could be simultaneously realized.

2) The leveling agents of Examples 1, 10, and 11 are leveling agents comprising a copolymer comprising (meth) acrylic acid repeating units containing at least one perfluoroalkyl group having 8 or more carbon atoms and (meth)acrylic acid repeating units having at least one bornane ring, and, further, (meth)acrylic acid repeating units containing a polyethylene oxide group or a polypropylene oxide group. These leveling agents are excellent particularly in the above effect 1).

3) From each Example, it is apparent that the molecular weight of the leveling agent is more preferably 3000 to 13000.

4) From Examples 24 to 28, it is apparent that toluene is preferably used in the coating solvent when the leveling agent is used.

5) Comparison of Example 17 with other Examples shows that, when an organosilane compound (hydrolyzate or partial condensate) is used in the anti-dazzling layer, the scratch resistance can be further improved while maintaining good planar appearance.

6) Comparison of Examples 29 to 37 with other Examples shows that, in using the leveling agent, when an organosilane compound (hydrolyzate or partial hydrolyzate) is also used in the low-refractive index layer, the scratch resistance can be further improved while maintaining good planar appearance.

7) For Example 37, an antireflection film with an antistatic layer, which had a surface resistivity lowered from not less than $1\times10^{14}$ (Ω/□) to $2\times10^8$ (Ω/□) and were very good in dust adherence, could be obtained by providing the antistatic layer.

Second Aspect of Invention

The following Examples further illustrate the present invention. However, it should be noted that the present invention is not limited to these Examples only. "Parts" and "%" are by mass unless otherwise specified.

(Preparation of Partial Condensate (I) of Hydrolyzate of Organosilane Compound)

Methyl ethyl ketone (120 parts), 100 parts of acryloxypropyltrimethoxysilane (KBM-5103: tradename, manufactured by The Shin-Etsu Chemical Co., Ltd.), and 3 parts of diisopropoxy aluminum ethylacetoacetate were placed in and mixed with each other in a reactor provided with a stirrer and a reflux condenser. Ion exchanged water (30 parts) was added, and a reaction was allowed to proceed at 60° C. for 4 hr. The reaction mixture was cooled to room temperature to give a partial condensate (I) of a hydrolyzate of an organosilane compound. The mass average molecular weight was 1600, and 100% of the oligomer or higher molecular weight components was components having a molecular weight of 1000 to 20000. Gas chromatography analysis showed that acryloxypropyltrimethoxysilane as the starting material was not present at all.

(Preparation of Coating Liquid 1 for Anti-dazzling Layer)

Pentaerythritol triacrylate (tradename (PET-30): manufactured by Nippon Kayaku Co., Ltd., refractive index 1.51) (26.64 parts by mass) as an ultraviolet curing resin, 1.44 parts by weight of DPHA (tradename: a mixture of dipentaerythritol pentaacrylate and dipentaerythritol hexaacrylate, manufactured by Nippon Kayaku Co., Ltd., refractive index 1.51) as an ultraviolet curing resin, 2.88 parts by mass of an acrylic polymer HR-AG Acryl (manufactured by The Intec, molecular weight 75,000), 1.37 parts by mass of Irgacure 184 (tradename, manufactured by Ciba Specialty Chemicals, K.K.) as a photocuring initiator, 1.49 parts by mass of acryl-styrene beads (manufactured by Soken Chemical Engineering Co., Ltd., particle diameter 3.5 μm, refractive index 1.55) as first light transparent fine particles, 4.64 parts by mass of styrene beads (manufactured by Soken Chemical Engineering Co., Ltd., particle diameter 3.5 μm, refractive index 1.60) as second light transparent fine particles, 0.046 part by mass of R-30 (tradename, manufactured by Dainippon Ink and Chemicals, Inc.) which is a leveling agent used in the present invention, 6.19 parts by mass of KBM-5103 (tradename, manufactured by The Shin-Etsu Chemical Co., Ltd.) as an organosilane compound, 38.71 parts by mass of toluene, and 16.59 parts by mass of cyclohexanone were thoroughly mixed together to prepare a coating liquid. The coating liquid was filtered through a polypropylene filter having a pore diameter of 30 μm to prepare a coating liquid 1 for an anti-dazzling layer.

(Coating Liquid 2 for Anti-dazzling Layer)

Pentaerythritol triacrylate (tradename (PET-30): manufactured by Nippon Kayaku Co., Ltd., refractive index 1.51) (18.25 parts by mass) as an ultraviolet curing resin, 9.83 parts by weight of M-215 (tradename, isocyanuric acid EO modified diacrylate, manufactured by TOAGOSEI Co., Ltd., refractive index 1.51) as an ultraviolet curing resin, 2.88 parts by mass of an acrylic polymer HR-AG Acryl (manufactured by The Intec, molecular weight 75,000), 1.37 parts by mass of Irgacure 184 (tradename, manufactured by Ciba Specialty Chemicals, K.K.) as a photocuring initiator, 1.49 parts by mass of acryl-styrene beads (manufactured by Soken Chemical Engineering Co., Ltd., particle diameter 3.5 μm, refractive index 1.55) as first light transparent fine particles, 4.64 parts by mass of styrene beads (manufactured by Soken Chemical Engineering Co., Ltd., particle diameter 3.5 μm, refractive index 1.60) as second light transparent fine particles, 0.046 part by mass of R-30 (tradename, manufactured by Dainippon Ink and Chemicals, Inc.) which is a leveling agent used in the present invention, 6.19 parts by mass of KBM-5103 (manufactured by The Shin-Etsu Chemical Co., Ltd.) as an organosilane compound, 38.71 parts by mass of toluene, and 16.59 parts by mass of cyclohexanone were thoroughly mixed together to prepare a coating liquid. The coating liquid was filtered through a polypropylene filter having a pore diameter of 30 μm to prepare a coating liquid 2 for an anti-dazzling layer.

(Preparation of Coating Liquids 3 to 37 for Anti-dazzling Layer)

Coating liquids 3 to 37 for an anti-dazzling layer were prepared in quite the same manner as in coating liquid 1 or 2 for an anti-dazzling layer, except that the type and proportion of the polyfunctional acrylic resin, or the amount of the photopolymerization initiator (based on the total mass of ionizing radiation curing-type polyfunctional resin) were changed as shown in Tables 7 and 8.

TABLE 7

| Sample No. | Coating liquid for antistatic layer | Coating liquid | Coating liquid for anti-dazzling layer Polyfunctional acrylic resin, mass % |
|---|---|---|---|
| Example sample 1 | None | Coating liquid 1 for anti-dazzling layer | PET-330DPHA = 95/5 |
| Example sample 2 | None | Coating liquid 2 for anti-dazzling layer | PET-30/isocyanuric acid EO modified diacrylate = 65/35 |
| Example sample 3 | None | Coating liquid 3 for anti-dazzling layer | PET-30 = 100 |
| Example sample 4 | None | Coating liquid 4 for anti-dazzling layer | PET-30/DPHA = 80/20 |
| Example sample 5 | None | Coating liquid 5 for anti-dazzling layer | PET-30/DPHA = 70/30 |
| Example sample 6 | None | Coating liquid 6 for anti-dazzling layer | PET-30/DPHA = 60/40 |
| Example sample 7 | None | Coating liquid 7 for anti-dazzling layer | PET-30/DPHA = 55/45 |
| Example sample 8 | None | Coating liquid 8 for anti-dazzling layer | PET-30/DPHA = 50/50 |
| Example sample 9 | None | Coating liquid 9 for anti-dazzling layer | PET-30/DPHA = 40/60 |
| Example sample 10 | None | Coating liquid 10 for anti-dazzling layer | PET-30/DPHA = 30/70 |
| Comparative Example sample 1 | None | Coating liquid 11 for anti-dazzling layer | DPHA = 100 |
| Comparative Example sample 2 | None | Coating liquid 12 for anti-dazzling layer | Dipentaerythritol hydroxypentaacrylate = 100 |
| Comparative Example sample 3 | None | Coating liquid 13 for anti-dazzling layer | Pentaerythritol tetraacrylate = 100 |
| Example sample 11 | None | Coating liquid 14 for anti-dazzling layer | Trimetylolpropane triacrylate = 100 |
| Example sample 12 | None | Coating liquid 15 for anti-dazzling layer | Ethoxylated trimethylolpropane triacrylate = 100 |
| Comparative Example sample 4 | None | Coating liquid 16 for anti-dazzling layer | Diethylene glycol diacrylate = 100 |
| Comparative Example sample 5 | None | Coating liquid 17 for anti-dazzling layer | Isocyanuric acid EO modified diacrylate = 100 |
| Example sample 13 | None | Coating liquid 18 for anti-dazzling layer | PET-30/isocyanuric acid EO modified diacrylate = 30/70 |
| Example sample 14 | None | Coating liquid 19 for anti-dazzling layer | PET-30/isocyanuric acid EO modified diacrylate = 40/60 |
| Example sample 15 | None | Coating liquid 20 for anti-dazzling layer | PET-30/isocyanuric acid EO modified diacrylate = 50/50 |
| Example sample 16 | None | Coating liquid 21 for anti-dazzling layer | PET-30/isocyanuric acid EO modified diacrylate = 55/45 |
| Example sample 17 | None | Coating liquid 22 for anti-dazzling layer | PET-30/isocyanuric acid EO modified diacrylate = 60/40 |
| Example sample 18 | None | Coating liquid 23 for anti-dazzling layer | PET-30/isocyanuric acid EO modified diacrylate = 70/30 |
| Example sample 19 | None | Coating liquid 24 for anti-dazzling layer | PET-30/isocyanuric acid EO modified diacrylate = 80/20 |
| Example sample 20 | None | Coating liquid 25 for anti-dazzling layer | PET-30/isocyanuric acid EO modified diacrylate = 90/10 |
| Example sample 21 | None | Coating liquid 26 for anti-dazzling layer | PET-30/isocyanuric acid EO modified diacrylate = 95/5 |
| Example sample 22 | None | Coating liquid 27 for anti-dazzling layer | PET-30/diethylene glycol diacrylate = 65/35 |
| Example sample 23 | None | Coating liquid 28 for anti-dazzling layer | PET-30/1,3-butanediol diacrylate = 65/35 |

| Sample No. | Amount of polymerization initiator, mass % | Coating liquid for low refractive index layer | Results of evaluation | |
|---|---|---|---|---|
| | | | Planar appearance | Pencil hardness |
| Example sample 1 | 4.5 | A | 4 | 2H |
| Example sample 2 | 4.5 | A | 5 | 2H |
| Example sample 3 | 4.5 | A | 4 | 2H |
| Example sample 4 | 4.5 | A | 4 | 2H |

TABLE 7-continued

| | | | | | |
|---|---|---|---|---|---|
| | Example sample 5 | 4.5 | A | 4 | 2H |
| | Example sample 6 | 4.5 | A | 4 | 2H |
| | Example sample 7 | 4.5 | A | 4 | 2H |
| | Example sample 8 | 4.5 | A | 3 | 2H |
| | Example sample 9 | 4.5 | A | 3 | 2H |
| | Example sample 10 | 4.5 | A | 3 | 2H |
| | Comparative Example sample 1 | 4.5 | A | 0 | 3H |
| | Comparative Example sample 2 | 4.5 | A | 1 | 2H |
| | Comparative Example sample 3 | 4.5 | A | 2 | 2H |
| | Example sample 11 | 4.5 | A | 3 | 2H |
| | Example sample 12 | 4.5 | A | 3 | 2H |
| | Comparative Example sample 4 | 4.5 | A | 5 | B |
| | Comparative Example sample 5 | 4.5 | A | 5 | B |
| | Example sample 13 | 4.5 | A | 5 | H |
| | Example sample 14 | 4.5 | A | 5 | H |
| | Example sample 15 | 4.5 | A | 5 | H |
| | Example sample 16 | 4.5 | A | 5 | 2H |
| | Example sample 17 | 4.5 | A | 5 | 2H |
| | Example sample 18 | 4.5 | A | 5 | 2H |
| | Example sample 19 | 4.5 | A | 5 | 2H |
| | Example sample 20 | 4.5 | A | 5 | 2H |
| | Example sample 21 | 4.5 | A | 4 | 2H |
| | Example sample 22 | 4.5 | A | 4 | 2H |
| | Example sample 23 | 4.5 | A | 4 | 2H |

TABLE 8

| Sample No. | Coating liquid for antistatic layer | Coating liquid | Coating liquid for anti-dazzling layer Polyfunctional acrylic resin, mass % | Amount of polymerization initiator, mass % | Coating liquid for low refractive index layer | Planar appearance | Pencil hardness |
|---|---|---|---|---|---|---|---|
| Example sample 24 | None | Coating liquid 29 for anti-dazzling layer | PET-30/DPHA = 95/5 | 1 | A | 4 | H |
| Example sample 25 | None | Coating liquid 30 for anti-dazzling layer | PET-30/DPHA = 95/5 | 2 | A | 4 | H |
| Example sample 26 | None | Coating liquid 31 for anti-dazzling layer | PET-30/DPHA = 95/5 | 3 | A | 4 | 2H |
| Example sample 27 | None | Coating liquid 32 for anti-dazzling layer | PET-30/DPHA = 95/5 | 5 | A | 4 | 2H |
| Example sample 28 | None | Coating liquid 33 for anti-dazzling layer | PET-30/DPHA = 95/5 | 6 | A | 4 | 2H |
| Example sample 29 | None | Coating liquid 34 for anti-dazzling layer | PET-30/DPHA = 95/5 | 7 | A | 4 | 2H |
| Example sample 30 | None | Coating liquid 35 for anti-dazzling layer | PET-30/DPHA = 95/6 | 8 | A | 4 | 2H |
| Example sample 31 | None | Coating liquid 36 for anti-dazzling layer | PET-30/DPHA = 95/5 | 10 | A | 3 | 2H |
| Example sample 32 | None | Coating liquid 37 for anti-dazzling layer | PET-30/DPHA = 95/5 | 12 | A | 3 | 2H |
| Example sample 33 | None | Coating liquid 1 for anti-dazzling layer | PET-30/DPHA = 95/5 | 4.5 | B | 4 | 2H |
| Example sample 34 | None | Coating liquid 2 for anti-dazzling layer | PET-30/isocyanuric acid EO modified diacrylate = 65/35 | 4.5 | B | 5 | 2H |
| Example sample 35 | Coating liquid 1 for antistatic layer | Coating liquid 38 for anti-dazzling layer | PET-30/DPHA = 95/5 | 4.5 | A | 4 | 3H |

(Preparation of Coating Liquid 38 for Anti-dazzling Layer)

Coating liquid 38 for an anti-dazzling layer was prepared in the same manner as in coating liquid 1 for an anti-dazzling layer, except that Bright GNR 4.6-EH (tradename, gold-nickel coated resin beads, manufactured by The Nippon Chemical Industrial Co., Ltd., average particle diameter 4.5 µm, spherical) as an electrically conductive material (electrically conductive particles) were added (amount: 0.1% of total amount of anti-dazzling layer) to coating liquid 1 for an anti-dazzling layer.

(Preparation of Coating Liquid A for Low-refractive Index Layer)

A heat crosslinking fluoropolymer having a refractive index of 1.44 JTA 113 (tradename, solid content 6%, MEK solution, manufactured by JSR Corporation) (13 g), 1.3 g of a colloidal silica dispersion liquid MEK-ST-L (tradename, average particle diameter 45 nm, solid content 30%, manufactured by Nissan Chemical Industries Ltd.), 0.6 g of the partial condensate (I) liquid of hydrolyzate of the organosilane compound, 5 g of methyl ethyl ketone, and 0.6 g of cyclohexanone were added and stirred, and the mixture was filtered through a polypropylene filter having a pore diameter of 1 µm to prepare coating liquid A for a low-refractive index layer.

(Preparation of Coating Liquid B for Low-refractive Index Layer)

A heat crosslinking fluoropolymer having a refractive index of 1.42 JN7228A (tradename, solid content 6%, MEK solution, manufactured by JSR Corporation) (13 g), 1.3 g of a colloidal silica dispersion MEK-ST-L (tradename, average particle diameter 45 nm, solid content 30%, manufactured by Nissan Chemical Industries Ltd.), 0.6 g of the partial condensate (I) liquid of hydrolyzate of the organosilane compound, 5 g of methyl ethyl ketone, and 0.6 g of cyclohexanone were added and stirred, and the mixture was filtered through a polypropylene filter having a pore diameter of 1 µm to prepare coating liquid B for a low-refractive index layer.

(Preparation of Coating Liquid I for Antistatic Layer)

A composition for transparent electrically conductive layer formation ASP-BJ-1 (tradename, manufactured by Sumitomo Osaka Cement Co., Ltd.) (100 g) and 10 g of PET-30 (tradename, pentaerythritol triacrylate, manufactured by Nippon Kayaku Co., Ltd., refractive index 1.51) as an ultraviolet curing resin were mixed with stirring, and the mixture was filtered through polypropylene filter having a pore diameter of 30 µm to prepare coating liquid I for an antistatic layer. ASP-BJ-1 had the following composition.

ATO: 6% by mass

Pentaerythritol triacrylate etc.: 14% by mass

Methyl ethyl ketone, isobutanol, etc.: 80% by mass

Example Sample 1

(1) Coating of Anti-dazzling Layer

An 80 µm-thick triacetylcellulose film (TD80U: tradename, manufactured by Fuji Photo Film Co., Ltd.) was wound off in a roll form, and coating liquid 1 for an anti-dazzling layer was coated to a coating thickness of 7 µm on a dry basis, and the coating was dried at 110° C. for 10 sec and at 50° C. for 20 sec. The coating was then photocured under nitrogen purge (oxygen concentration: not more than 200 ppm) by irradiation with ultraviolet light (half-curing) at 55 mJ (integrated quantity of light) to form an anti-dazzling layer which was then wound.

(2) Coating of Low-refractive Index Layer

The triacetylcellulose film coated with the anti-dazzling layer was again wound off and was coated with coating liquid A for a low-refractive index layer to a thickness of 100 nm on a dry basis. The coating was dried at 120° C. for 70 sec, was further dried at 110° C. for 10 min, was heat cured, was irradiated with ultraviolet light (full curing) at 120 mJ (integrated quantity of light) under nitrogen purge (oxygen concentration: not more than 100 ppm) for photocuring to form an antireflection film coated with a low-refractive index layer which was then wound.

(3) Saponification of Antireflection Film

After the antireflection film formation, the following treatment was carried out.

A 1.5 mol/L aqueous sodium hydroxide solution was prepared and was kept at 55° C. A 0.005 mol/L aqueous dilute sulfuric acid solution was prepared and was kept at 35° C. The antireflection film was immersed in the aqueous sodium hydroxide solution for 2 min.

Thereafter, the antireflection film was then immersed in water to thoroughly wash away the aqueous sodium hydroxide solution. Next, the antireflection film was immersed in the above aqueous dilute sulfuric acid solution for one min and was then immersed in water to thoroughly wash away the aqueous dilute sulfuric acid solution. Finally, the antireflection film was thoroughly dried at 120° C.

Thus, a saponified antireflection film was prepared as Example sample 1.

Example Samples 2 to 34 and Comparative Example Samples 1 to 5

Example samples 2 to 34 and Comparative Example samples 1 to 5 were prepared in quite the same manner as in Example sample 1, except that the coating liquid for an anti-dazzling layer and the coating liquid for a low-refractive index layer were changed as shown in Tables 4 and 5.

(Evaluation of Antireflection Film)

The films thus obtained were evaluated for the following items. The results are shown in Table 4 and Table 5.

(1) Cure Shrinkage Unevenness (Folding Wrinkles) Planar Evaluation

A smooth glass plate was provided, and a crossed Nicol polarizing plate was applied to one glass face (rendered black). A pressure-sensitive adhesive was applied to the opposite glass face, and an antireflection film was evenly applied to the pressure-sensitive adhesive for a planar test sample. This sample was subjected to a reflection planar test under a three-wavelength fluorescent lamp to evaluate the curing shrinkage unevenness (folding wrinkle) planar state in detail.

0: Poor planar appearance 1 to 2: Goal unattainment

3: Acceptable 4 to 5: Considerably good to very good (2) Measurement of Pencil Hardness (Surface Hardness)

The antireflection film was humidified under an environment of temperature 25° C. and relative humidity 60% for 2 hr and was evaluated for pencil hardness with a test pencil specified in JIS S 6006 according to an evaluation method for pencil hardness specified in JIS K 5400. The load was 4.9 N. The test was carried out 5 times (n=5). In the test, when the film remained unbroken three times or more out of five times, the pencil hardness was regarded as acceptable.

B to HB: Goal unattainment

H, 2H, 3H: Goal attainment (2H is superior to H, and 3H is superior to 2H)

Example sample 35 was prepared by coating an antistatic layer (AS layer) onto a triacetylcellulose film and coating a coating liquid 38 for an anti-dazzling layer under the following film forming conditions, and coating coating liquid A for a low-refractive index layer on the antistatic layer in the same manner as in Example 1 sample.

(Conditions for Formation of Antistatic Layer and Anti-dazzling Layer in Example Sample 35)

Coating liquid I for an antistatic layer was coated onto a triacetylcellulose film (TD 80U: tradename, manufactured by Fuji Photo Film Co., Ltd.) to a thickness of 1.2 µm. The coating was dried at 60° C. for 30 sec and was irradiated with UV (half-curing) at an integrated quantity of light of 70 mJ under nitrogen purge (oxygen concentration: not more than 200 ppm) to form an antistatic layer. Coating liquid 38 for an anti-dazzling layer was coated onto the antistatic layer so that the effective thickness of the anti-dazzling layer was 5.5 µm. The coating was dried at 40° C. for 30 sec and was then irradiated with UV (half-curing) under nitrogen purge (oxygen concentration; not more than 200 ppm) at an integral quantity of light of 39 mJ to form an anti-dazzling layer. The composition of coating liquid 38 for an anti-dazzling layer was the same as in coating liquid 1 for an anti-dazzling layer, except that 0.1%, based on the total amount of the anti-dazzling layer, of Bright GNR 4.6-EH (tradename, gold-nickel coated resin beads: manufactured by The Nippon Chemical Industrial Co., Ltd.) as an electrically conductive material (electrically condutive particles) was added to coating liquid 1 for an anti-dazzling layer. Further, a low-refractive index layer was formed on the anti-dazzling layer in the same manner as in the coating of the low-refractive index layer, except that coating liquid A or a low-refractive index layer was used. Thus, a final antireflection film was prepared.

(Summary of Results)

Tables 4 and 5 demonstrate the following facts and show that the present invention is very effective for providing an anti-dazzling film, which can ensure satisfactory surface hardness, does not have noticeable curing shrinkage uevenness (not recognized as abnormal appearance) and can meet a market demand for increased area and evenness, and an antireflection film using this anti-dazzling film.

1) Comprising a trifunctional acrylic resin as at least one resin is effective for simultaneously realizing both planar appearance and pencil hardness requirements.

2) The use of pentaerythritol triacrylate as at least one of the trifunctional acrylic resins is further advantageous in planar appearance.

3) The use of the trifunctional acrylic resin in an amount of not less than 55% by mass based on the total mass of the ionizing radiation curing-type polyfunctional resin is advantageous in ensuring a pencil hardness of 2H.

4) Comprising at least one bifunicitional acrylic resin other than the trifunctional acrylic resin can further improve planar appearance.

5) A largest improvement in planar appearance can be realized when at least one of the bifunctional acrylic resins is isocyanuric acid ethoxy modified diacrylate.

6) The use of the bifunctional acrylic resin in an amount of not less than 10% by mass and not more than 45% by mass based on the total mass of the ionizing radiation curing-type polyfunctional resin is effective for simultaneously realizing a further improvement in planar appearance and ensuring of pencil hardness 2H.

7) A content of the polymerization initiator of not less than 3% by mass and not more than 8% by mass based on the total mass of the ionizing radiation curing-type polyfunctional resin is effective in simultaneously realizing a further improvement in planar appearance and ensuring of pencil hardness 2H.

8) All the Example samples except for Example sample 35 have a surface resistivity of not less than $1 \times 10^{14}$ ($\Omega/\square$), and, in Example sample 35, the surface resistivity is reduced to $2 \times 10^8$ ($\Omega/\square$) by providing an antistatic layer. Accordingly, an antireflection film with an antistatic layer, which has excellent planar appearance and pencil hardness and has particularly good dust adherence preventive properties, can be provided.

Use of the Present Invention

The anti-dazzling film (antireflection film) according to the first and second aspects of the present invention can be applied to image display devices such as liquid crystal display devices (LCDs), plasma display panels (PDPs), electroluminescent displays (ELDs), and cathode-ray tube displays (CRTs). The antireflection film according to the present invention comprises a transparent base material film, and, thus, in use, the antireflection film on its transparent base material film side is bonded to an image display surface of an image display device.

When the anti-dazzling film (antireflection film) according to the first and second aspects of the present invention, when used as one side of a surface protective film for a polarizing film, can be preferably used in transmission-type, reflection-type, or semitransmission-type liquid crystal display devices of twisted nematic (TN), super twisted nematic (STN), vertical alignment (VA), in-plane switching (IPS), optically compensated bend cell (OCB) and other modes. Further, the anti-dazzling film (antireflection film) according to the first and second aspects of the present invention can be preferably used particularly in 19-in. or larger liquid crystal monitors or liquid crystal televisions.

The invention claimed is:

1. An anti-dazzling film for an antireflection film having a low-refractive index layer, said anti-dazzling film comprising:
   a triacetylcellulose film; and
   an anti-dazzling layer provided on the triacetylcellulose film;
   wherein said anti-dazzling layer comprises a coating composition comprising a light transparent resin comprising an acrylic resin, plastic light transparent fine particles having a particle diameter of at least 0.5 μm and not more than 10 μm, and means for simultaneously providing a planar appearance, homogeneity and scratch resistance comprising a leveling agent comprising a copolymer comprising (meth)acrylic acid repeating units containing at least one perfluoroalkyl group having 8 or more carbon atoms and (meth)acrylic acid repeating units having at least one bornane ring;
   wherein said low-refractive index layer has a lower refractive index than the refractive index of said anti-dazzling layer and is provided on said anti-dazzling layer.

2. The anti-dazzling film according to claim 1, wherein said coating composition of said anti-dazzling layer comprises two or more types of said plastic light transparent fine particles.

3. The anti-dazzling film according to claim 1, further comprising an antistatic layer comprising at least an ionizing radiation curing resin and an electrically conductive material provided between said triacetylcellulose film and said anti-dazzling layer; and
   means for ensuring continuity between said antistatic layer and an outermost surface of said anti-dazzling film contained in said anti-dazzling layer, said means comprising electrically conductive particles.

4. The anti-dazzling film according to claim 3, wherein said anti-dazzling layer, said low-refractive index layer, or said antistatic layer comprises at least one of an organosilane compound represented by general formula [I]

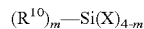

$(R^{10})_m-Si(X)_{4-m}$     [I]

wherein $R^{10}$ represents a hydrogen atom, an alkyl group, or an aryl group, X represents a hydroxyl group or a hydrolyzable group, and m is an integer of 1 to 3, a hydrolyzate of said organosilane compound, and a partial condensate thereof.

5. An antireflection film comprising:
   a triacetylcellulose film; and
   an anti-dazzling layer and a low-refractive index layer, having a lower refractive index than a refractive index of said anti-dazzling layer, provided, in that order, on said triacetylcellulose film;
   wherein said anti-dazzling layer comprises a coating composition comprising a light transparent resin comprising an acrylic resin, plastic light transparent fine particles having a particle diameter of at least 0.5 μm and not more that 10 μm, and means for simultaneously providing a planar appearance, homogeneity and scratch resistance comprising a leveling agent comprising a copolymer comprising (meth)acrylic acid repeating units containing at least one perfluoroalkyl group having 8 or more carbon atoms and (meth)acrylic acid repeating units having at least one bornane ring.

6. The antireflection film according to claim 5, wherein said coating composition of said anti-dazzling layer comprises two or more types of said plastic light transparent fine particles.

7. The antireflection film according to claim 5, further comprising an antistatic layer comprising at least an ionizing radiation curing resin and an electrically conductive material provided between said triacetylcellulose film and said anti-dazzling layer; and
  means for ensuring continuity between said antistatic layer and an outermost surface of the antireflection film contained in said anti-dazzling layer, said means comprising electrically conductive particles.

8. The antireflection film according to claim 7, wherein said anti-dazzling layer, said low-refractive index layer, or said antistatic layer comprises at least one of an organosilane compound represented by general formula [I]

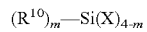

wherein $R^{10}$ represents a hydrogen atom, an alkyl group, or an aryl group, X represents a hydroxyl group or a hydrolyzable group, and in is an integer of 1 to 3, a hydrolyzate of said organosilane compound, and a partial condensate thereof.

9. An anti-dazzling film for an antireflection film having a low-refractive index layer, said anti-dazzling film comprising:
  a triacetylcellulose film; and
  an anti-dazzling layer provided on said triacetylcellulose film;
  wherein said anti-dazzling layer comprises a coating composition comprising plastic light transparent fine particles having a particle diameter of at least 0.5 µm and not more than 10 µm, means for simultaneously providing a planar appearance, homogeneity and scratch resistance comprising a leveling agent comprising a copolymer comprising (meth)acrylic acid repeating units containing at least one perfluoroalkyl group having 8 or more carbon atoms and (meth)acrylic acid repeating units having at least one bornane ring, and a curing composition comprising light transparent ionizing radiation curing polyfunctional resins at least one of which comprises a trifunctional acrylic resin;
  wherein said low-refractive index layer has a lower refractive index than a refractive index of said anti-dazzling layer and is provided on the anti-dazzling layer.

10. The anti-dazzling film according to claim 9, wherein an addition amount of said trifunctional acrylic resin is not less than 55 mass % based on a total mass of said light transparent ionizing radiation curing polyfunctional resin.

11. The anti-dazzling film according to claim 9, wherein said light transparent ionizing radiation curing polyfunctional resin comprises at least one bifunctional acrylic resin other than said trifunctional acrylic resin.

12. The anti-dazzling film according to claim 11, wherein an addition amount of said bifunctional acrylic resin is not less than 10 mass % and not more than 45 mass % based on a total mass of said light transparent ionizing radiation curing polyfunctional resin.

13. The anti-dazzling film according to claim 9, further comprising an antistatic layer comprising a curing composition comprising a light transparent ionizing radiation curing polyfunctional resin and an electrically conductive material provided between said triacetylcellulose film and said anti-dazzling layer; and
  means for ensuring continuity between said antistatic layer and an outermost surface of the antireflection film contained in said anti-dazzling layer, said means comprising electrically conductive particles.

14. The anti-dazzling film according to claim 13, wherein said anti-dazzling layer, said low-refractive index layer, or said antistatic layer comprises at least one of an organosilane compound represented by general formula [I]

wherein $R^{10}$ represents a hydrogen atom, an alkyl group, or an aryl group, X represents a hydroxyl group or a hydrolyzable group, and m is an integer of 1 to 3, a hydrolyzate of said organosilane compound, and a partial condensate thereof.

15. The anti-dazzling film according to claim 9, wherein said coating composition of said anti-dazzling layer comprises two or more types of said plastic light transparent fine particles.

16. An antireflection film comprising:
  a triacetylcellulose film; and
  an anti-dazzling layer and a low-refractive index layer, having a lower refractive index than a refractive index of said anti-dazzling layer, provided in that order on said triacetylcellulose film;
  wherein said anti-dazzling layer comprises a coating composition comprising plastic light transparent fine particles having a particles diameter of at least 0.5 µm and not more than 10 µm, means for simultaneously providing a planar appearance, homogeneity and scratch resistance comprising a leveling agent comprising a copolymer comprising (meth)acrylic acid repeating units containing at least one perfluoroalkyl group having 8 or more carbon atoms and (meth)acrylic acid repeating units having at least one bornane ring, and a curing composition comprising light transparent ionizing radiation curing polyfunctional resins at least one of which comprises a trifunctional acrylic resin.

17. The antireflection film according to claim 16, wherein an addition amount of said trifunctional acrylic resin is not less than 55 mass % based on a total mass of said light transparent ionizing radiation curing polyfunctional resin.

18. The antireflection film according to claim 16, wherein said light transparent ionizing radiation curing polyfunctional resin comprises at least one bifunctional acrylic resin other than said trifunctional acrylic resin.

19. The antireflection film according to claim 18, wherein an addition amount of said bifunctional acrylic resin is not less than 10 mass % and not more than 45 mass % based on a total mass of said light transparent ionizing radiation curing polyfunctional resin.

20. The antireflection film according to claim 16, further comprising an antistatic layer comprising a curing composition, comprising an ionizing radiation curing polyfunctional resin and an electrically conductive material, provided between said triacetylcellulose film and the anti-dazzling layer; and
  means for ensuring continuity between said antistatic layer and an outermost surface of said antireflection film contained in said anti-dazzling layer, said means comprising electrically conductive particles.

21. The antireflection film according to claim 20, wherein said anti-dazzling layer, said low-refractive index layer, or said antistatic layer comprises at least one of an organosilane compound represented by general formula [I]

wherein $R^{10}$ represents a hydrogen atom, an alkyl group, or an aryl group, X represents a hydroxyl group or a hydrolyzable group, and m is an integer of 1 to 3, a hydrolyzate of said organosilane compound, and a partial condensate thereof.

22. The antireflection film according to claim 16, wherein said coating composition of said anti-dazzling layer comprises two or more types of said plastic light transparent fine particles.

23. A polarizing plate comprising:
a polarizing film; and
an anti-dazzling film according to claim 1 provided on a surface of said polarizing film so that a surface of said triacetylcellulose film on a side thereof that is remote from said anti-dazzling layer faces said surface of said polarizing film.

24. An image display device comprising:
a light transparent display;
a light source device for applying light from a backside of said light transparent display; and
an anti-dazzling film according to claim 1 provided on a surface of said light transparent display.

25. An image display device comprising:
a light transparent display;
a light source device for applying light from a backside of said light transparent display; and
an antireflection film according to claim 5 provided on a surface of said light transparent display.

26. A polarizing plate comprising:
a polarizing film; and
an antireflection film according to claim 16 provided on a surface of said polarizing film so that a surface of said triacetylcellulose film on a side thereof remote from said anti-dazzling layer faces said surface of said polarizing film.

27. An image display device comprising:
a light transparent display;
a light source device for applying light from a backside of said light transparent display; and
an antireflection film according to claim 16 provided on a surface of said light transparent display.

28. An image display device comprising:
a light transparent display;
a light source device for applying light from a backside of said light transparent display; and
a polarizing plate according to claim 23 provided on a surface of said light transparent display.

29. The anti-dazzling film according to claim 9, wherein said coating composition further comprises a toluene solvent in an amount of at least 25 mass % to 60 mass % based on a total amount of said coating composition.

30. The anti-dazzling film according to claim 16, wherein said coating composition further comprises a toluene solvent in an amount of at least 25 mass % to 60 mass % based on a total amount of said coating composition.

31. A polarizing plate comprising:
a polarizing film; and
an antireflection film according to claim 5 provided on a surface of said polarizing film so that a surface of said triacetylcellulose on a side thereof that is remote from said anti-dazzling layer faces said surface of said polarizing film.

32. An image display device comprising:
a light transparent display;
a light source device for applying light from a backside of said light transparent display; and
a polarizing plate according to claim 31 provided on a surface of said light transparent display.

33. The anti-dazzling film according to claim 1, wherein said anti-dazzling layer has a thickness of 1-10 μm.

34. The anti-dazzling film according to claim 5, wherein said anti-dazzling layer has a thickness of 1-10 μm.

35. The anti-dazzling film according to claim 9, wherein said anti-dazzling layer has a thickness of 1-10 μm.

36. The anti-dazzling film according to claim 16, wherein said anti-dazzling layer has a thickness of 1-10 μm.

* * * * *